(12) United States Patent
Campos

(10) Patent No.: US 11,258,242 B2
(45) Date of Patent: Feb. 22, 2022

(54) MODULAR CONDUIT CABLE MANAGEMENT ASSEMBLY

(71) Applicant: Luis Campos, North Little Rock, AR (US)

(72) Inventor: Luis Campos, North Little Rock, AR (US)

(73) Assignee: BL United, LLC, North Little Rock, AR (US)

( * ) Notice: Subject to any disclaimer, the term of this patent is extended or adjusted under 35 U.S.C. 154(b) by 0 days.

(21) Appl. No.: 16/539,229

(22) Filed: Aug. 13, 2019

(65) Prior Publication Data
US 2021/0075202 A1    Mar. 11, 2021

(51) Int. Cl.
*H02G 3/04* (2006.01)
*F16L 3/26* (2006.01)

(52) U.S. Cl.
CPC ............. *H02G 3/0481* (2013.01); *F16L 3/26* (2013.01)

(58) Field of Classification Search
CPC .. H02G 3/0437; H02G 3/0462; H02G 3/0468; H02G 3/0475; H02G 3/0471; H02G 3/0487; H02G 3/0493; H02G 3/0481; F16L 3/015; F16L 3/26
See application file for complete search history.

(56) References Cited

U.S. PATENT DOCUMENTS

| | | | |
|---|---|---|---|
| 1,225,867 A | 5/1917 | Schumacher | |
| 2,024,862 A | 12/1935 | Hooley | |
| 4,596,531 A * | 6/1986 | Schawann | E21B 17/012 441/133 |
| 5,824,957 A * | 10/1998 | Holshausen | H02G 3/0475 174/95 |
| 5,900,586 A * | 5/1999 | Carr | A47B 21/06 174/95 |
| 6,321,524 B1 * | 11/2001 | Bro | H02G 3/045 248/49 |
| 6,433,282 B1 * | 8/2002 | Traversa | H02G 3/0475 138/118 |
| 6,639,152 B2 * | 10/2003 | Glew | G02B 6/4435 174/113 C |

(Continued)

FOREIGN PATENT DOCUMENTS

| | | | |
|---|---|---|---|
| DE | 202004011695 U1 * | 12/2005 | ........... H02G 3/0475 |
| EP | 2000724 | 10/2008 | |

(Continued)

*Primary Examiner* — Jonathan Liu
*Assistant Examiner* — Guang H Guan
(74) *Attorney, Agent, or Firm* — Rashauna Norment

(57) ABSTRACT

A modular conduit cable management assembly is used with tall vertical structures for holding and managing one or more cables, with the assembly having a plurality of conduit members and a plurality of removable closure members. Each conduit member has at least one retaining arm, a plurality of prongs, an anchor, and a core, with each conduit member defining a slot opening, a plurality of apertures, a holding cavity forming a conduit track, and a receiving chamber. Once assembled, one or more cables can be installed within the conduit track, with at least one of the closure members closing the conduit member slot opening. The cables and each conduit track may be accessed at a later time after removing the closure member.

14 Claims, 19 Drawing Sheets

(56) References Cited

U.S. PATENT DOCUMENTS

| | | | | |
|---|---|---|---|---|
| 7,278,253 | B2* | 10/2007 | Wehler | B25J 19/0025 |
| | | | | 59/78.1 |
| 8,266,882 | B2* | 9/2012 | Hermey | H02G 3/0475 |
| | | | | 59/78.1 |
| 8,297,560 | B2* | 10/2012 | Hung | F16L 3/015 |
| | | | | 248/49 |
| 9,022,827 | B2* | 5/2015 | Snyder, II | F16L 1/24 |
| | | | | 441/133 |
| 9,274,301 | B2 | 3/2016 | Her | |
| 9,534,708 | B2* | 1/2017 | Cripps, II | F16L 3/22 |
| 9,972,984 | B1* | 5/2018 | Tisbo | H02G 3/0475 |
| 10,392,869 | B2* | 8/2019 | Roodenburg | E21B 17/085 |
| 10,844,992 | B2* | 11/2020 | Harrop | F16L 57/02 |
| D913,962 | S * | 3/2021 | Campos | F16L 57/02 |
| | | | | D13/155 |
| D915,302 | S * | 4/2021 | Campos | D13/155 |
| D926,707 | S * | 8/2021 | Campos | A47B 21/06 |
| | | | | D13/155 |
| 2002/0038718 | A1* | 4/2002 | Gianfranchi | H02G 3/0475 |
| | | | | 174/97 |
| 2006/0213572 | A1 | 9/2006 | Beaulieu | |
| 2011/0095162 | A1 | 4/2011 | Parduhn | |
| 2014/0123438 | A1 | 5/2014 | Donovan | |
| 2020/0044425 | A1* | 2/2020 | Jaeker | H02G 3/0475 |
| 2021/0075202 | A1* | 3/2021 | Campos | H02G 3/0437 |

FOREIGN PATENT DOCUMENTS

| | | | |
|---|---|---|---|
| EP | 2760091 | 12/2017 | |
| WO | WO-2016207132 A1 * | 12/2016 | H02G 11/006 |

* cited by examiner

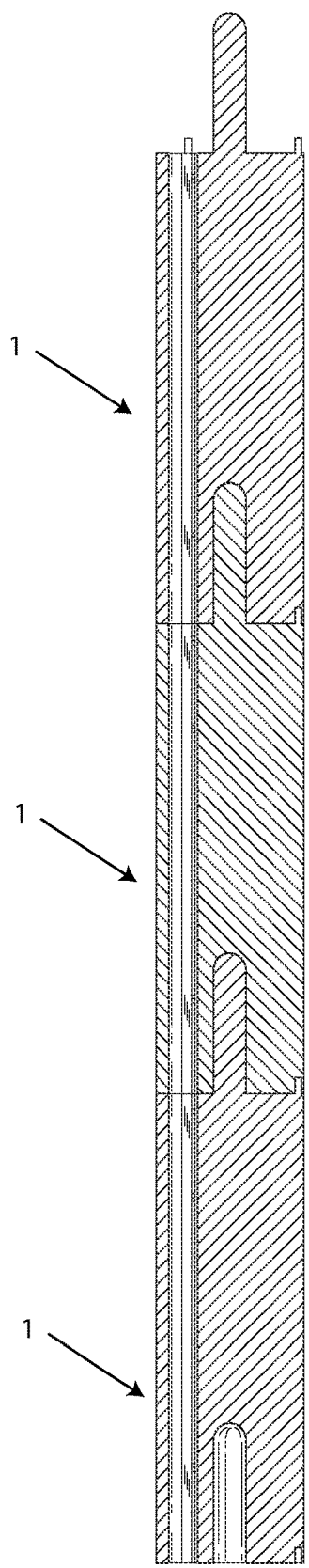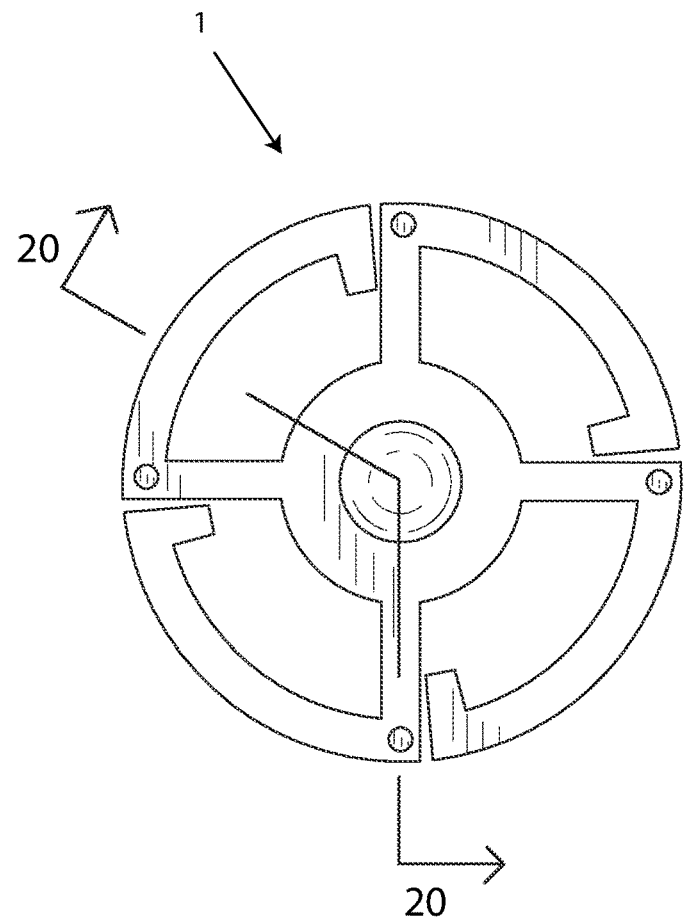
FIG. 20
FIG. 21

MODULAR CONDUIT CABLE MANAGEMENT ASSEMBLY

CROSS-REFERENCE TO RELATED APPLICATIONS

Not applicable.

FEDERALLY SPONSORED RESEARCH AND DEVELOPMENT

Not applicable.

BACKGROUND OF THE INVENTION

1. Field of the Invention

In general, the invention is a modular conduit cable management assembly for use with a vertical structure, and for retaining and managing one or more cables within a conduit track along the length of a plurality of conduit members of the assembly.

2. Description of Arguably Related Art Including Information Disclosed for 37 CFR L97 and 1.98

In some conventional conduits that retain one or more cables or wires, the conduit is only usable for a single time after setup and installation. Conventional conduit is essentially a tube or pipe used to protect cables or wires therein, and to route those cables or wires to and from a destination. Examples of a conduit include a PVC pipe, a metal pipe, a plastic pipe, any other tubing material, or any other pipe material that is adapted to retain cables, with the pipe having an exterior surface that can withstand weather and environmental elements. The cables or wires may be electrical cables, telecommunication cables, fiber optic cables, power cables, copper cables, or computer-aided three-dimensional interactive application cables (CATIA), including CATIA v5, CATIA v6, or CATIA v7.

A conduit pipe may be installed onto, next to, near to, or against the length of tall vertical structures including, but not limited to, water tanks, cellular towers, commercial buildings, and residential homes. Height examples of a tall vertical structure is at least 75 feet, preferably 100 feet high. Securing the conduit pipe to the vertical structure typically requires attaching a clamp, tie, or brace (collectively, "clamp") around the conduit pipe, then fastening the clamp to the vertical structure. Examples of clamps, braces, and ties include duct clamps, metal clamps, metal braces, metal ties, plastic clamps, plastic braces, and plastic zip ties. Plastic clamps, braces and tie are insufficient for long term use. Alternatively, the conduit pipe may remain freestanding and secured to the ground or surface at the base of the conduit pipe. Many conventional pipes have a hollow interior, and are not suitable for multiple cable management.

During installation, the cable is inserted and retained within the conduit pipe, with the cable extending through the top of the conduit pipe for coupling at or within the vertical structure. Alternatively, the cable may be installed directly up the length of the vertical structure and secured directly to the vertical structure with a clamp. One problem with the conventional conduits secured using exposed cable with plastic clamps to the vertical structure is that the weather and environmental conditions tend to degrade the plastic clamps over time, thereby requiring frequent replacement of the clamps. If metal clamps are used with conduit pipe, the metal clamps will cut into the conduit pipe shell over time due to vibration of the wind and damage from weather elements.

Accessing cable or individual conduit pipe sections after installation is usually not practical. Because most conduit pipe has a solid exterior, the entire conduit track must be dismantled for repair or access to the cable or any individual section(s) of conduit pipe. The user must then install another, separate conduit pipe and run new cables through the conduit. If access after installation is anticipated, then the user may also install junction boxes rather than a single continuous conduit pipe or modular sections of solid, conduit pipe. Junction boxes are generally installed in intervals to the desired conduit height, but such use further complicates pulling cable through the junction boxes. Additionally, pulling or directing cable through conduit pipes coupled to junction boxes increases the risk of bending, pinching, or damaging the cable. Installing junction boxes also requires using multiple employees, leading to additional expense and time. This process results in the conduit pipe being useful for only a single installation and does not allow for installing more cables within the same conduit.

Another problem with using conventional conduit pipe for vertical structures is lack of cable management. Most cable is placed inside a hollow pipe section of the conduit pipe, but multiple cables can tangle along the length of the conduit during installation. Without an effective cable management system, the user may also have to install at least two different sets of conduit pipes or tracks along or near the vertical structure to separate certain cables from others, for example, separating power electrical cables from the other cables. Other conventional cable management assemblies are only suitable for indoor installation or short vertical structures.

U.S. Patent Application Publication No. 20060213572 filed by Beaulieu discloses a multi-sectional conduit. This invention uses a length of conduit for encasing at least one electrical wire or cable, with the system comprising two or more longitudinal conduit sections. Each conduit section has one or more tabs or slots on the other longitudinal conduit section when brought together to prevent relative longitudinal movement of the conduit system. When assembled, the conduit forms a solid exterior without any longitudinal or side openings for cable access.

U.S. Patent Application Publication No. 20140123438 filed by Donovan discloses a cord management sleeve that retains an electric cord bent in several segments in a bow tie arrangement. There is a longitudinal slot therein; however, when assembled, the conduit forms a solid exterior without any longitudinal or side openings for cable access.

U.S. Pat. No. 2,024,862 issued to Hooley discloses a means for connecting conduits for electric cables or wires that, at desired intervals, spaces can be caused to temporarily give access to any one of such spaces to enable operations to be performed or closed to keep conduits continuous. The connecting means or coupling are junction sleeves. Hooley discloses support for gripping cables using a tapering member with boring. When assembled, the conduit forms a solid exterior without any longitudinal or side openings for cable access. Hooley's structure is impractical when used with tall vertical structures because various components would not stay together at such heights. Therefore, Hooley would be rendered useless for tall vertical structures.

None of the listed patent references teach each and every element of the claimed invention. None of the listed patent references teach, disclose, or suggest modifying one or more of the references to yield the claimed invention.

A need exists for a modular conduit cable management assembly for use next to or with a tall vertical structure having a height of at least 75 feet, for retaining and managing one or more cables within a track along the length of an assembly of a plurality of conduit members, and for accessing individual conduit members and cables after installation for repair or replacement.

SUMMARY OF THE INVENTION

In general, an embodiment of the invention is a modular conduit cable management assembly for use with tall vertical structures and for managing one or more cables comprising (including or having) a plurality of conduit members and a plurality of closure members. Each of the plurality of conduit members has an elongated, cylindrical body having at least one retaining arm and a plurality of prongs, and with each of the plurality of conduit members having a core and an anchor. Each of the plurality of conduit members further defines a receiving chamber, a slot opening, a cavity, and a plurality of holes. At least one of the plurality of closure members removably encloses and compresses the body of at least one of the plurality of conduit members to close the slot opening.

In one embodiment, the invention is a modular conduit cable management assembly for retaining one or more cables for use with a vertical structure, Here, the modular conduit cable management assembly has (includes or comprises):

a. a plurality of conduit members, each of the plurality of conduit members having a core and a body, with the body having a first end and an opposing second end, at least one retaining arm, an anchor, and a plurality of prongs extending from the first end of the body, with each of the plurality of conduit members defining at least one slot opening for receiving the one or more cables, at least one holding cavity forming a conduit track for holding the one or more cables, a chamber for coupling with the anchor of a second of the plurality of conduit members, and a plurality of apertures within the second end of the body for coupling with the plurality of prongs of the second of the plurality of conduit members;

b. a plurality of closure members, each of the plurality of closure members being adapted for enclosing the at least one slot opening of at least one of the plurality of conduit members; and c. wherein the plurality of conduit members each being selectively assembled first end-to-second end, with each of the plurality of apertures of a first of the plurality of conduit members being coupled to each corresponding plurality of prongs of the second of the plurality of conduit members, and with the chamber of the first of the plurality of conduit members being coupled to the anchor of the second of the plurality of conduit members forming a stable assembly having at least one conduit track therein for retaining the one or more cables, wherein each of the plurality of closure members enclosing the at least one slot opening of each of the plurality of conduit members.

In the embodiment shown in the figures, the invention is a modular conduit cable management assembly for use with a tall vertical structure and for retaining and organizing one or more cables, the modular conduit cable management assembly comprising;

a plurality of conduit members, each individual conduit member comprising a core, at least one flexible retaining arm biased in an open position, a plurality of prongs, and an anchor, with each individual conduit member further defining a cavity forming a conduit track for holding and organizing cables with the cavity, a slot opening to receive the cables, a plurality of holes at a second end of the conduit member for each coupling to each of the corresponding plurality of prongs of a second conduit member, and a receiving chamber for receiving the anchor of the second conduit member; and a plurality of closure members for removably encircling at least one of the plurality of conduit members to push the retaining arm to a closed position wherein the individual modular conduit members are aligned and assembled end to end for vertical installation of cables, with one or more cables inserted through the slot opening of the track, with the user applying pressure to the closure member to close retaining arm, and wherein each individual conduit member is assessable after installation by removing the closure member to return retaining arm to its biased open position as shown in the figures.

It is an object of this invention to provide a modular conduit cable management assembly for use next to or with a tall vertical structure having a height of at least 75 feet, for retaining and managing one or more cables within a track along the length of a plurality of conduit members, and for accessing individual conduit members and cables after installation for repair or replacement.

BRIEF DESCRIPTION OF THE SEVERAL VIEWS OF THE DRAWING

The invention may be more readily described by reference to the accompanying drawing figures and the following description of the drawing figures. In the drawing:

FIG. 20 is a cross section view of FIG. 14 thereof;

FIG. 21 is a top plan view of FIG. 20 thereof;

The broken lines showing the vertical structure, and the cables are for illustrative purposes only, and do not form part of the claimed invention.

Figure 1:
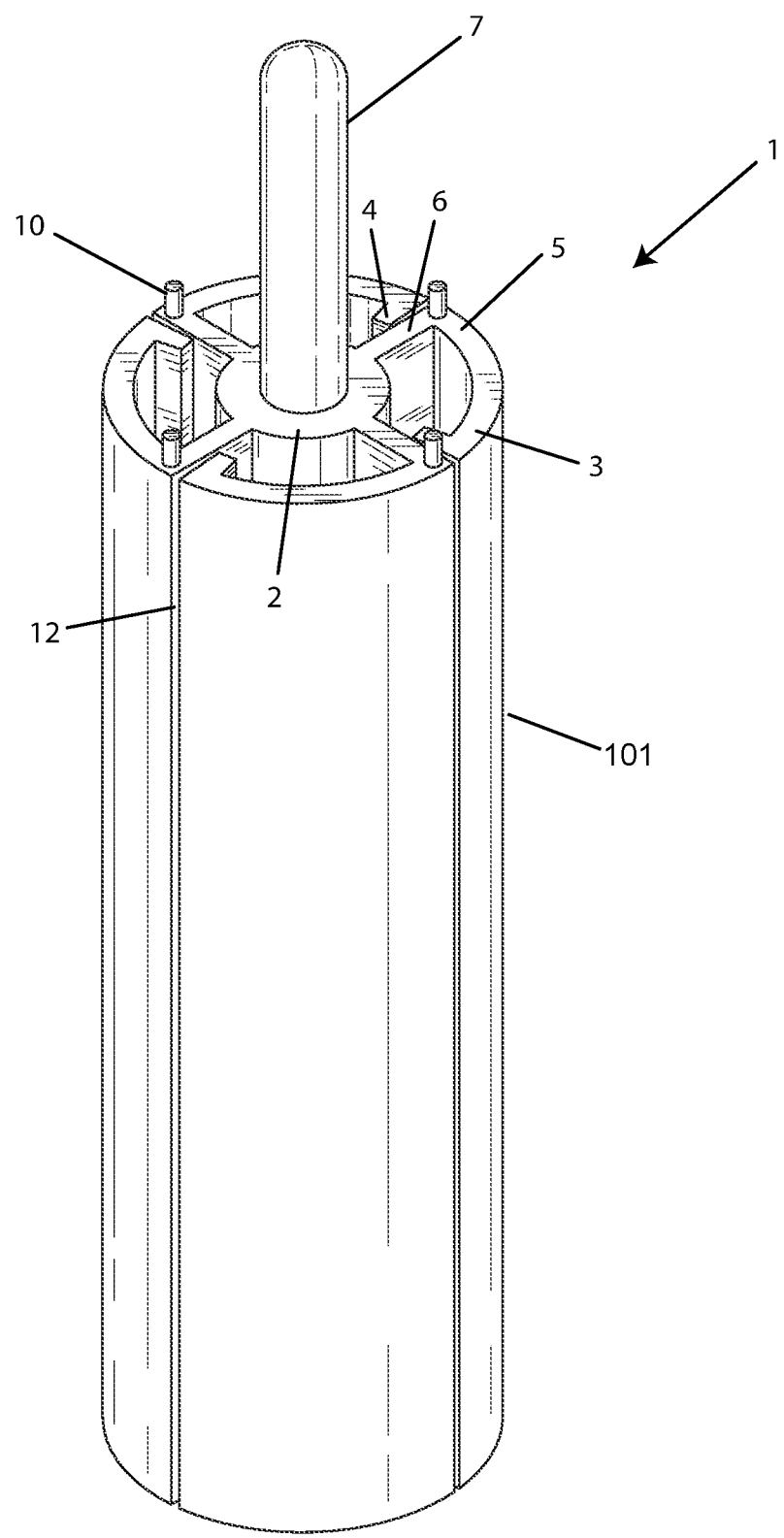
FIG. 1 is a perspective view of a modular conduit cable management assembly, showing, a conduit member having four retaining arms, with each of the four retaining arms being biased in an open position.
Figure 2:
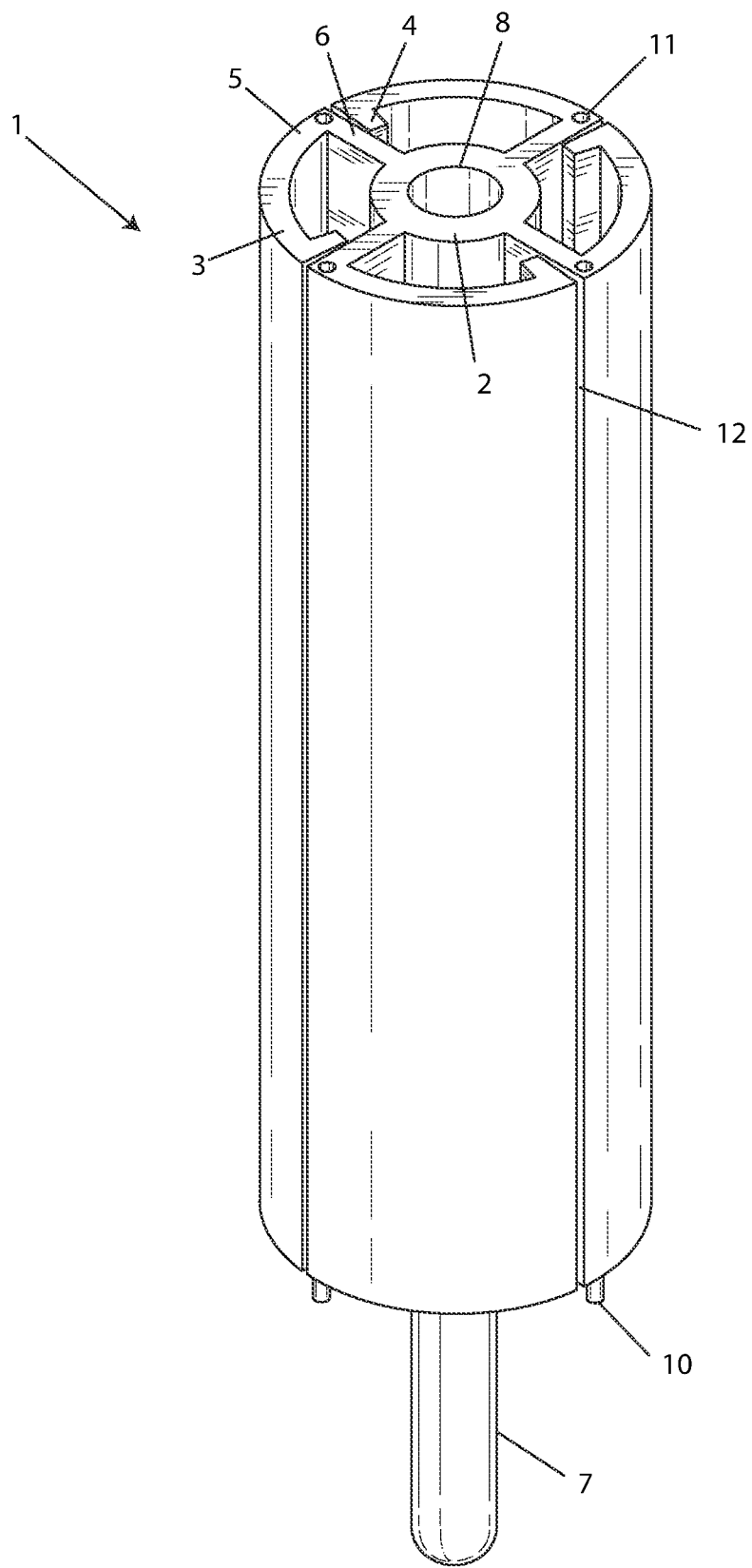
FIG. 2 is another perspective view thereof.
Figure 3:
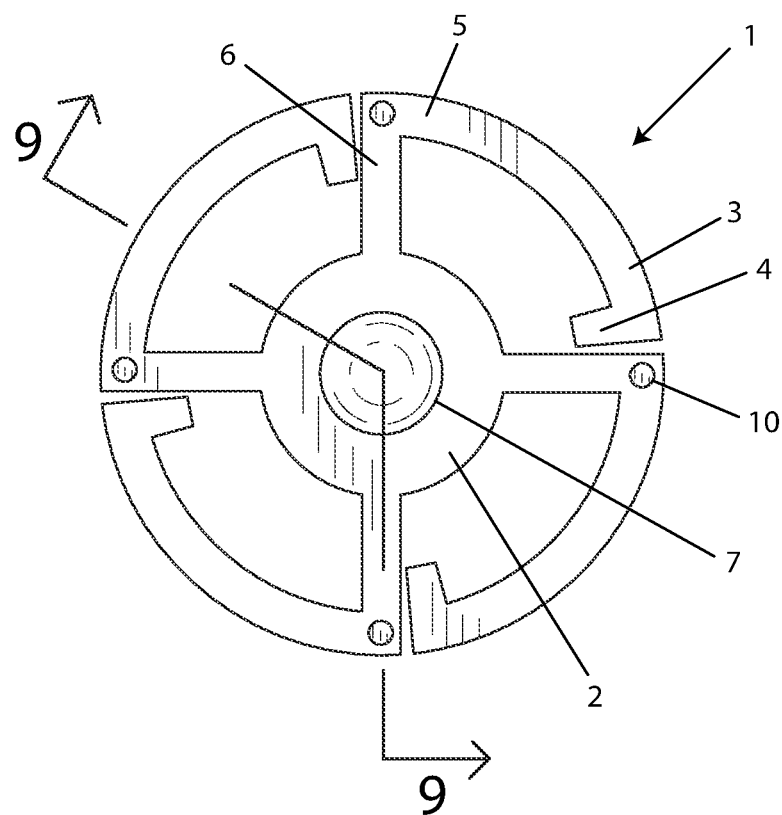
FIG. 3 is a top plan view thereof.
Figure 4:
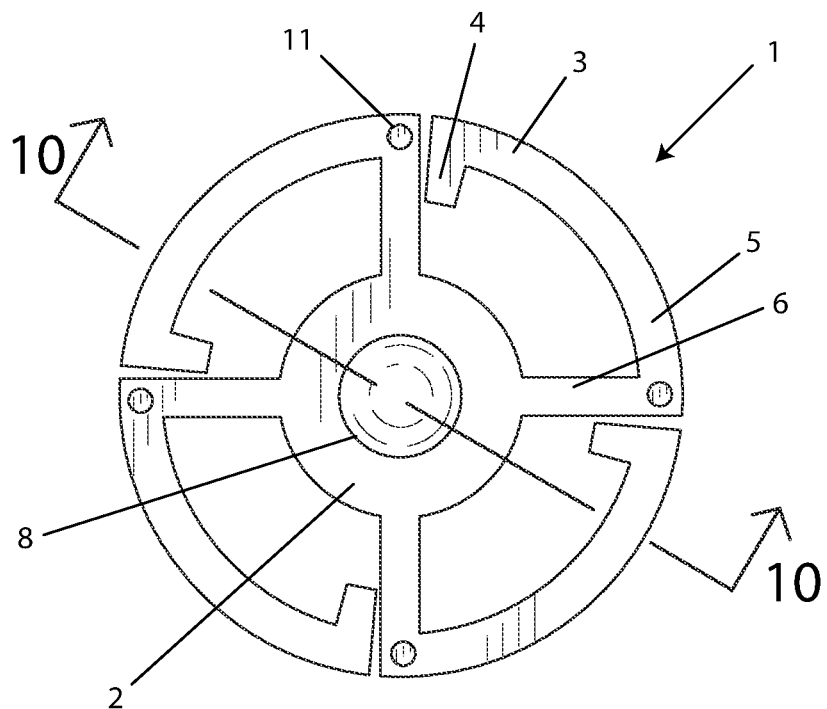
FIG. 4 is a bottom plan view thereof.
Figure 5:
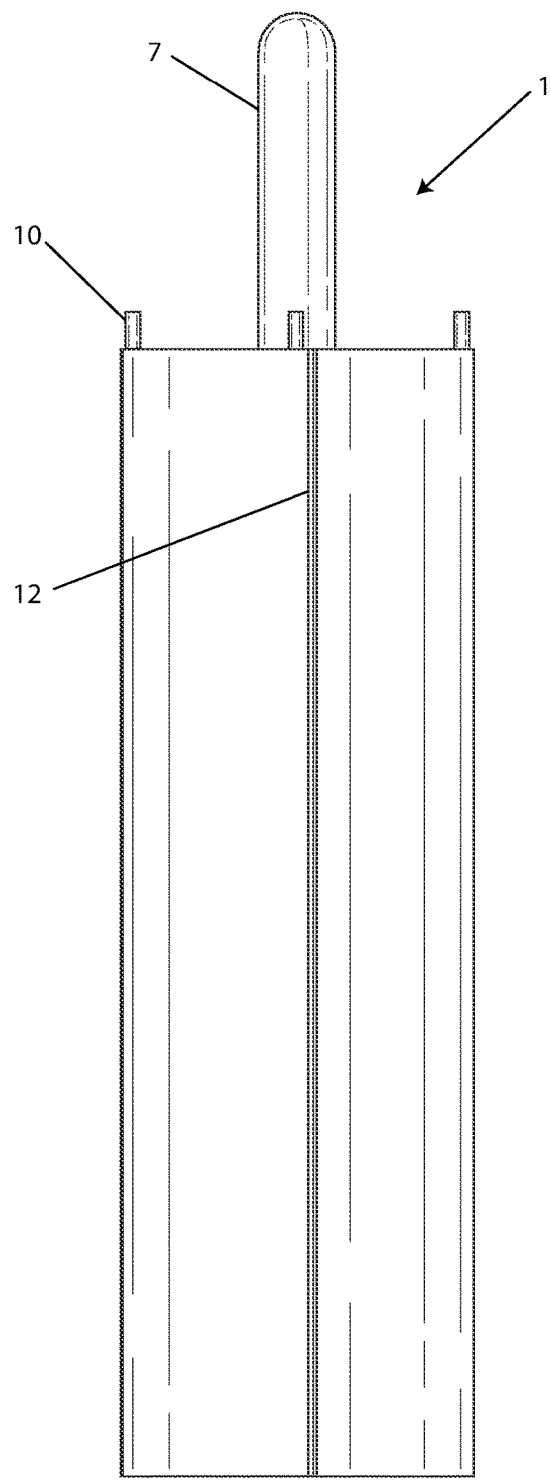
FIG. 5 is a front elevation view thereof.
Figure 6:
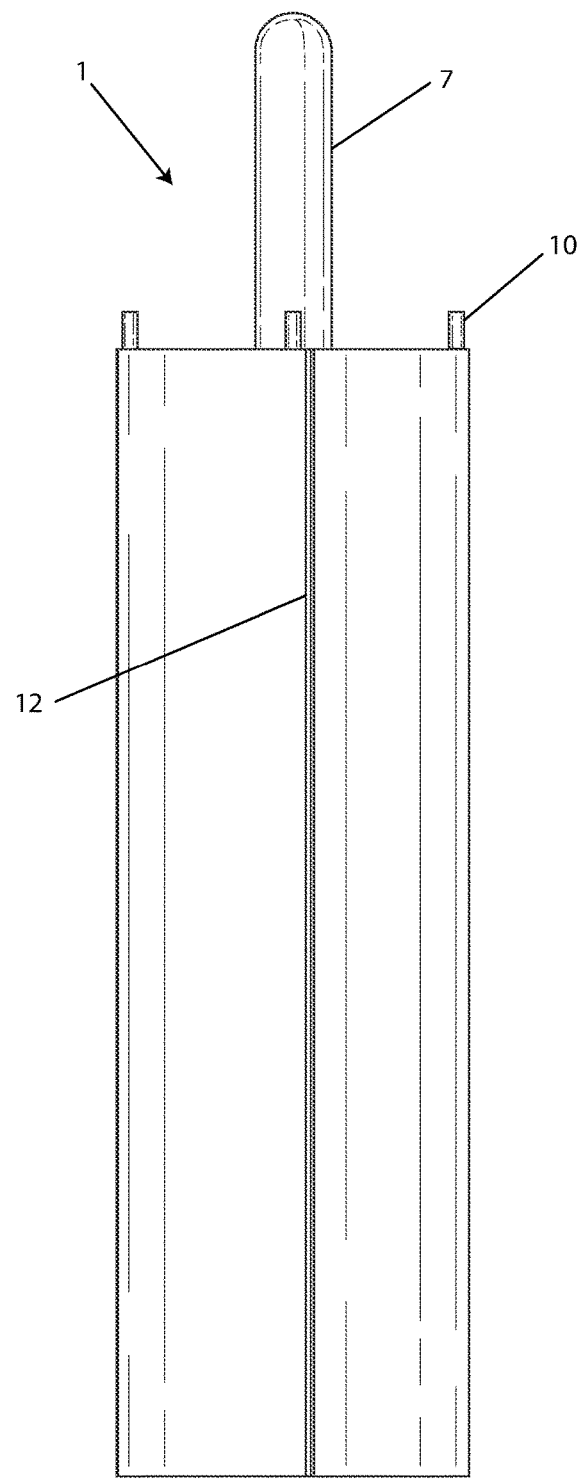
FIG. 6 is a rear elevation view thereof.
Figure 7:
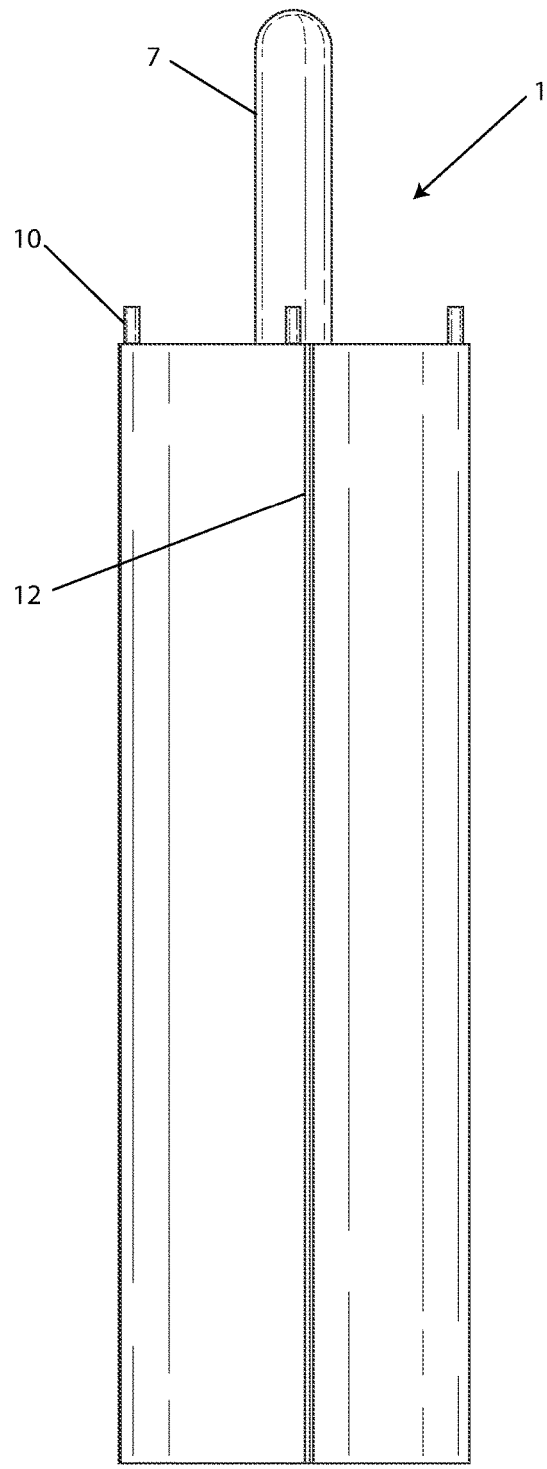
FIG. 7 is a left side elevation view thereof.
Figure 8:
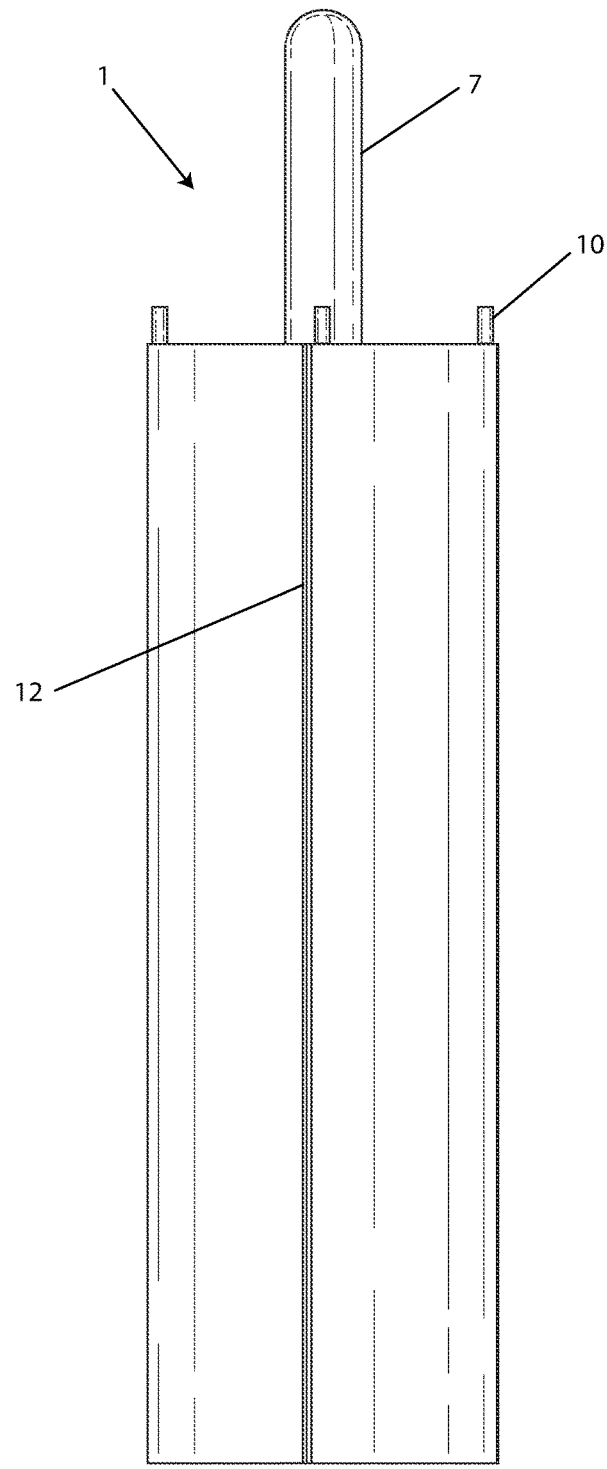
FIG. 8 is a right side elevation view thereof.
Figure 9:
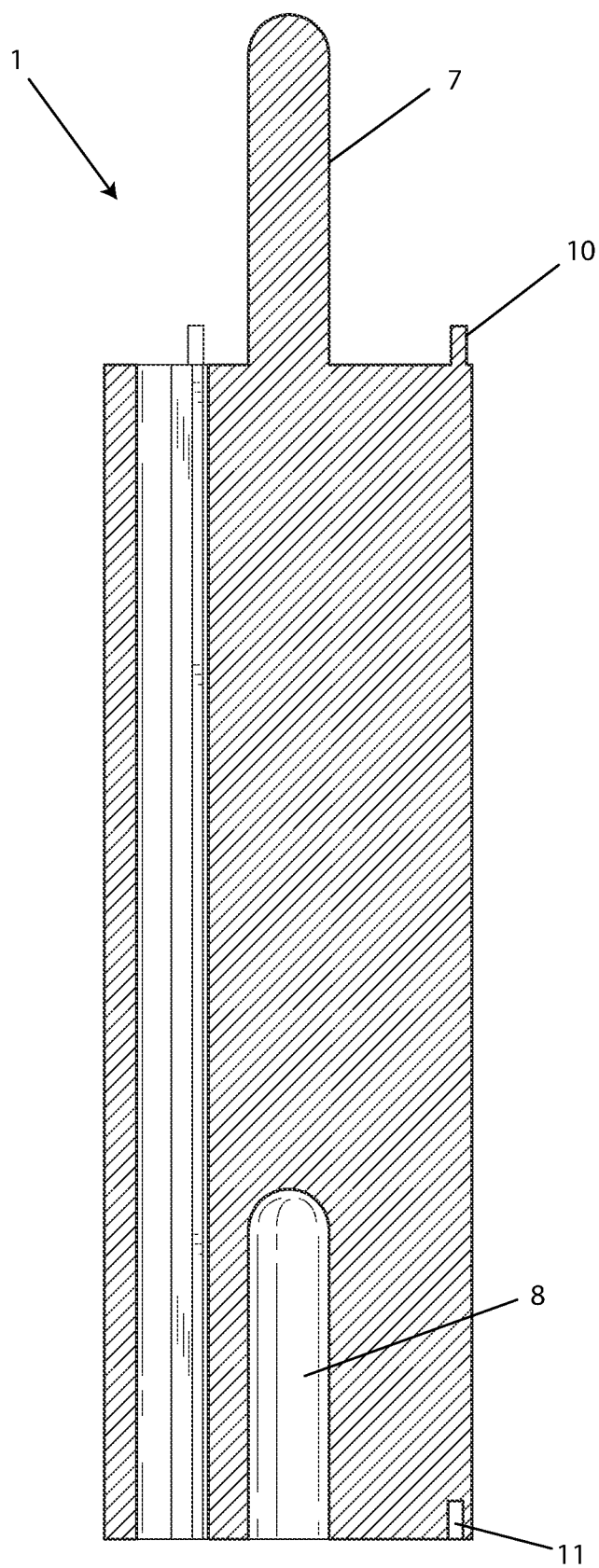
FIG. 9 is a cross-section view of FIG. 3 thereof.
Figure 10:
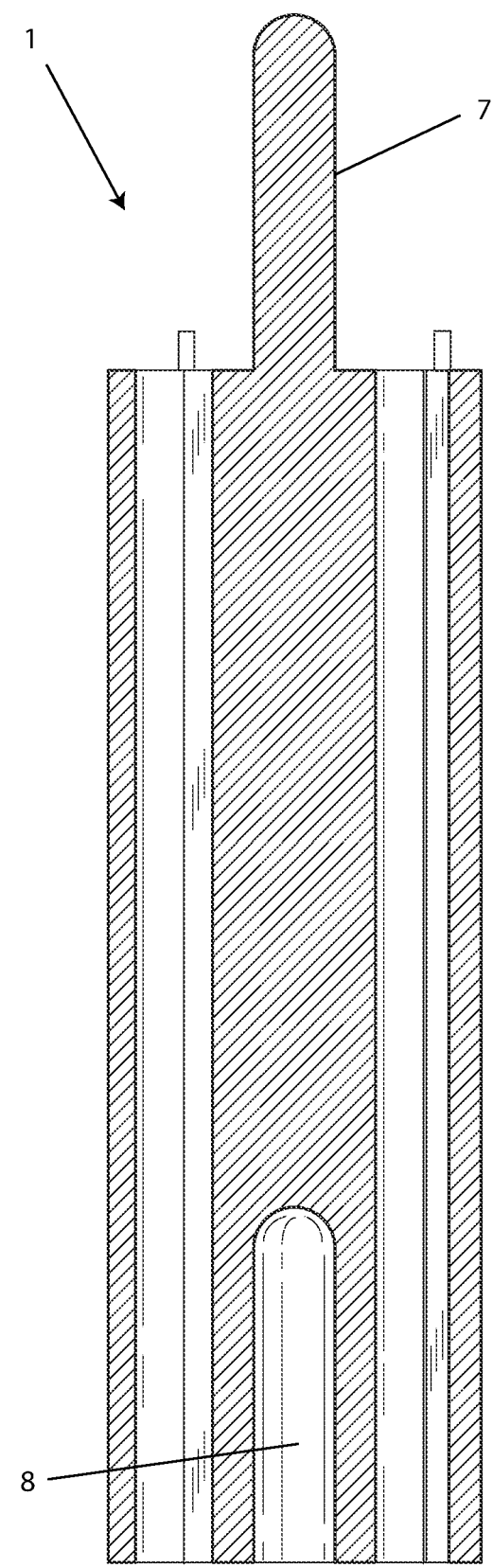
FIG. 10 is a cross-section view of FIG. 4 thereof.
Figure 14:
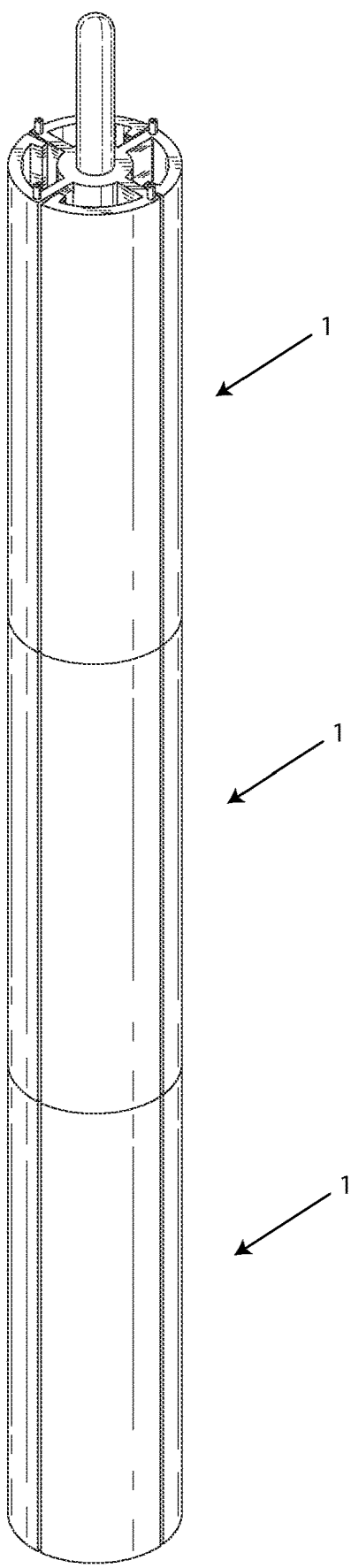
FIG. 14 is a perspective view of FIG. 11 thereof, showing three conduit members assembled.
Figure 15:
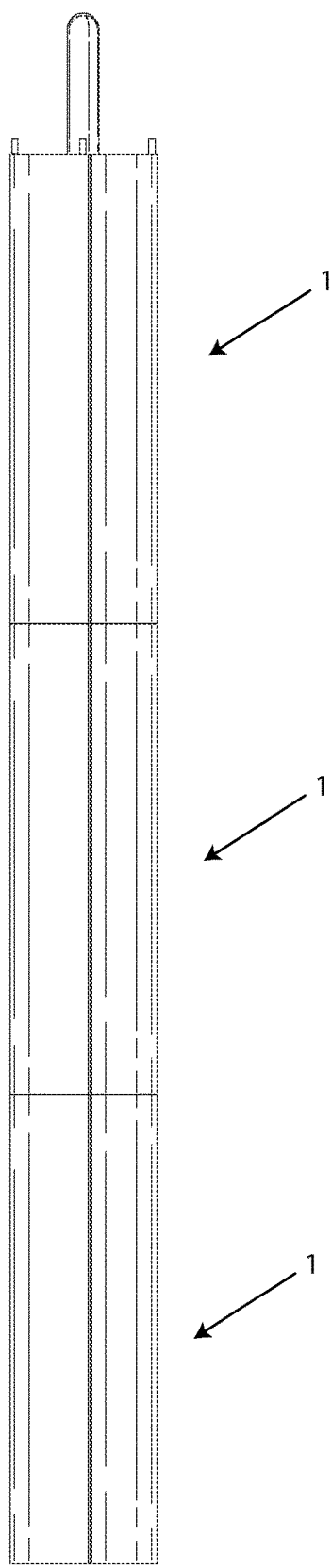
FIG. 15 is a front elevation view of FIG. 14 thereof.
Figure 16:
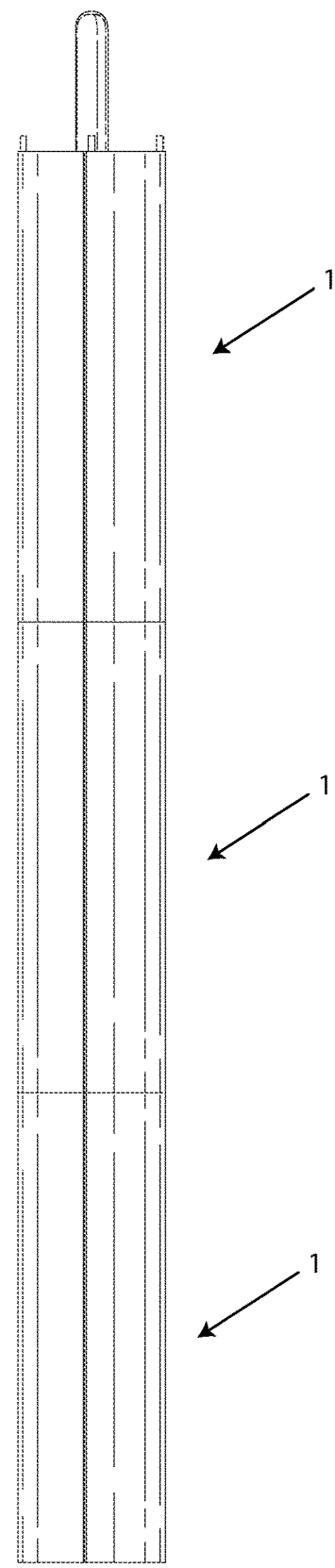
FIG. 16 is a rear elevation view of FIG. 14 thereof.
Figure 17:
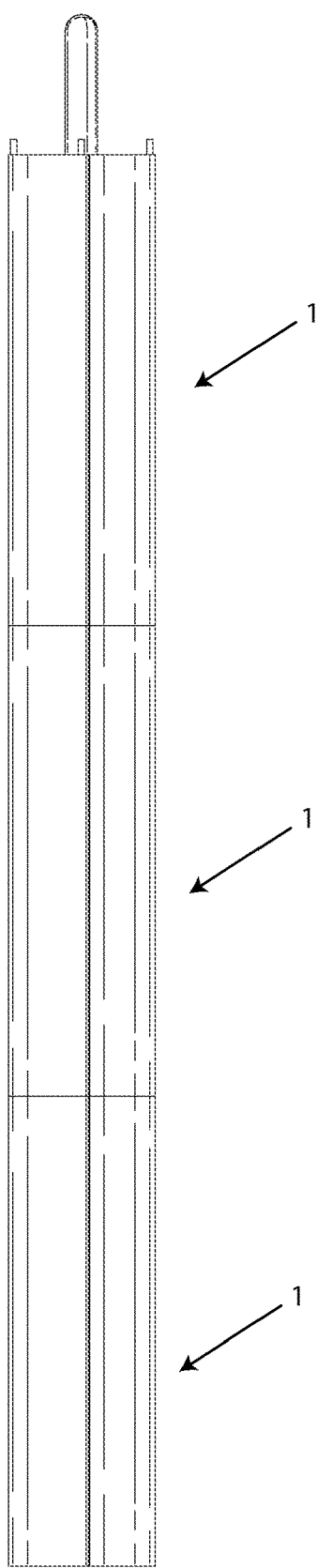
FIG. 17 is a left side elevation view of FIG. 14 thereof.
Figure 18:
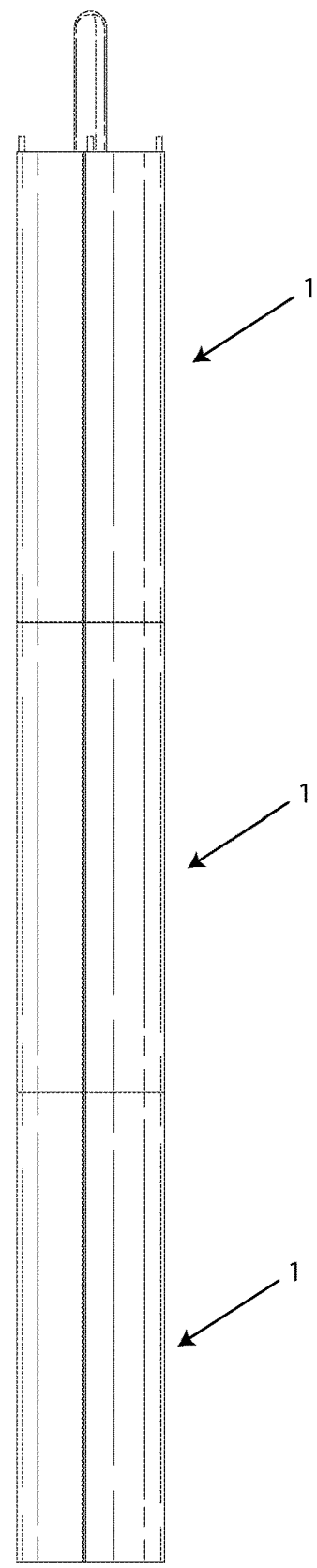
FIG. 18 is a right side elevation view of FIG. 14 thereof.

The top plan view and bottom plan view of the embodiment shown in FIG. 14 is identical to the corresponding views shown in FIGS. 3 and 4 and are incorporated herein by reference. The bottom plan view of the embodiment shown in FIG. 21 is identical to the corresponding view shown in FIG. 4 and is incorporated herein by reference.

DETAILED DESCRIPTION OF THE INVENTION

The present invention, preferred embodiments of the invention, and the accompanying drawing figures as described herein should not be construed as limited to the illustrated drawing. Rather the illustrated embodiment(s) are detailed to provide a thorough disclosure suitable to convey the scope of the invention to those skilled in the art. For the sake of simplicity, the conjunctive "and" may also be taken to include the disjunctive "or," and vice versa, whenever necessary to give the claims of this patent application the broadest interpretation and construction possible. Likewise, when the plural form, is used, it may be taken to include the singular form, and vice versa.

Figure 11:
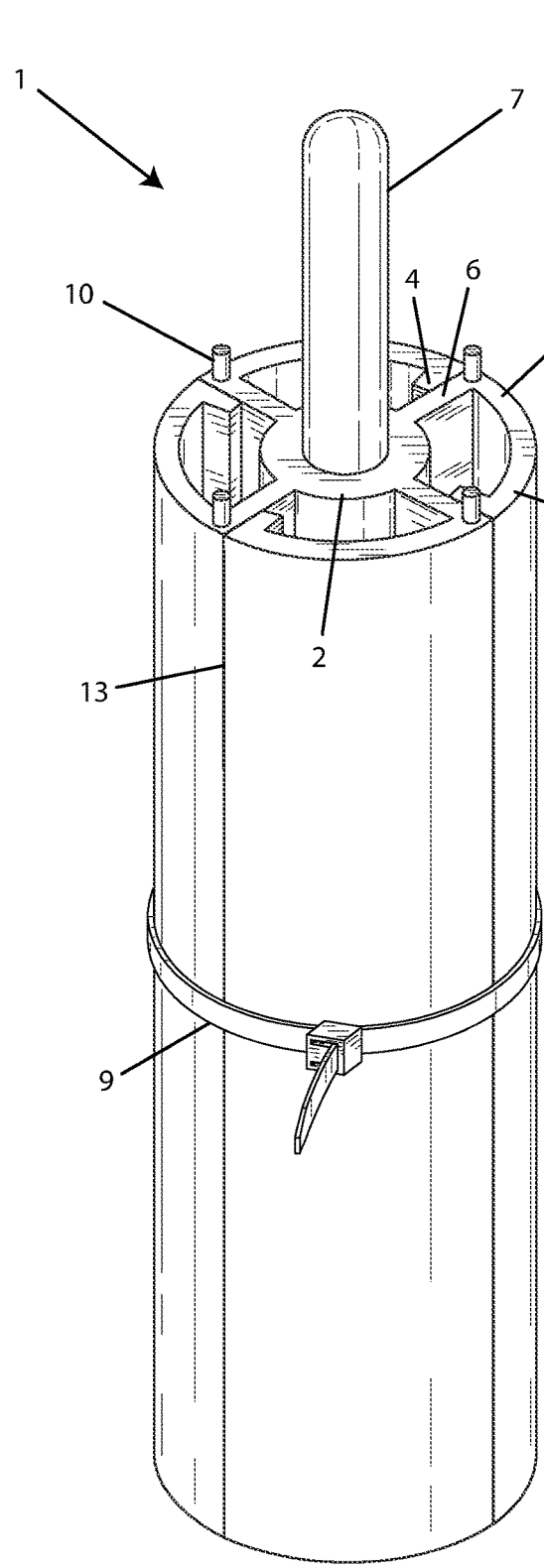
FIG. 11 is another perspective view of the FIG. 1 thereof, showing two conduit members assembled and enclosed with a closure member.
Figure 12:
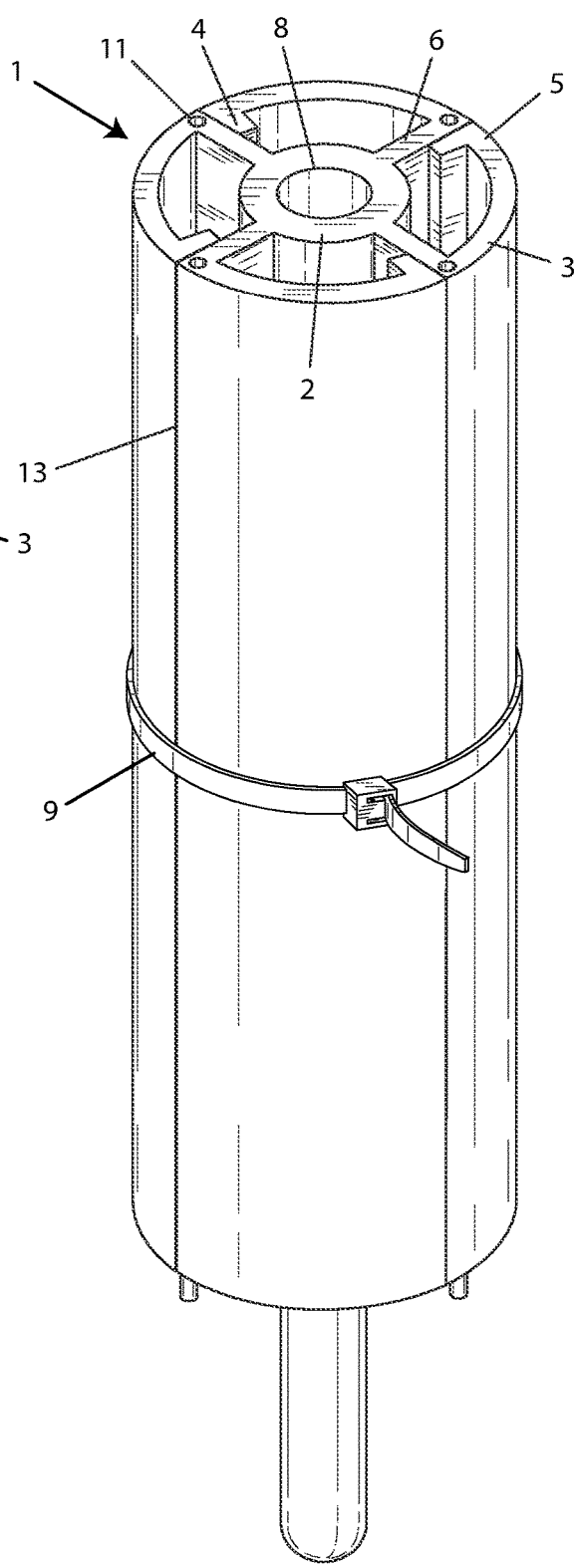
FIG. 12 is another perspective view of FIG. 11 thereof.
Figure 13:
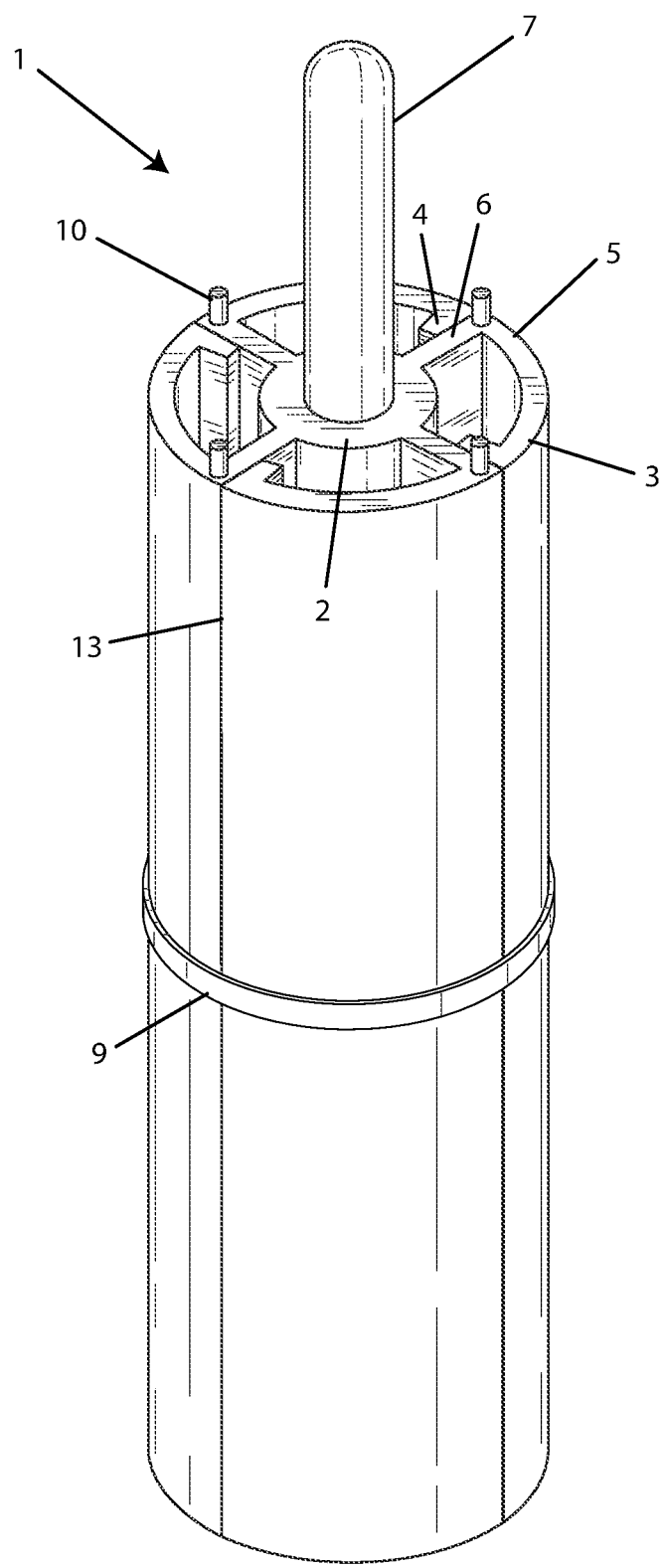
FIG. 13 is another perspective view of FIG. 11 thereof.
Figure 19:
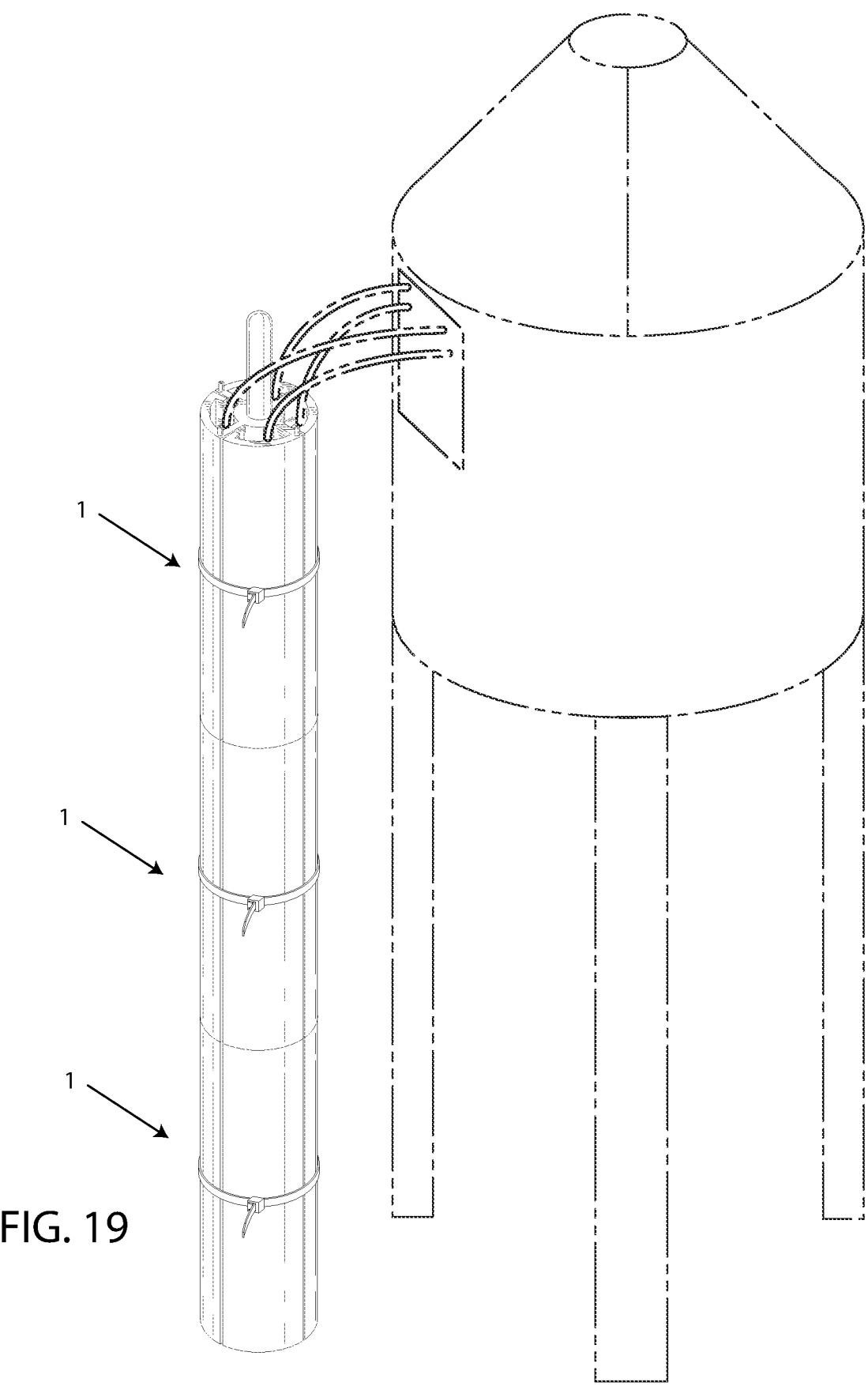
FIG. 19 is a perspective view of an embodiment of FIG. 11, showing the assembly in use next to a vertical structure, with a plurality of conduit members assembled and enclosed with a plurality of closure members, with a plurality of cables extending from the plurality of conduit tracks and inserting into the vertical structure.
Figure 22:
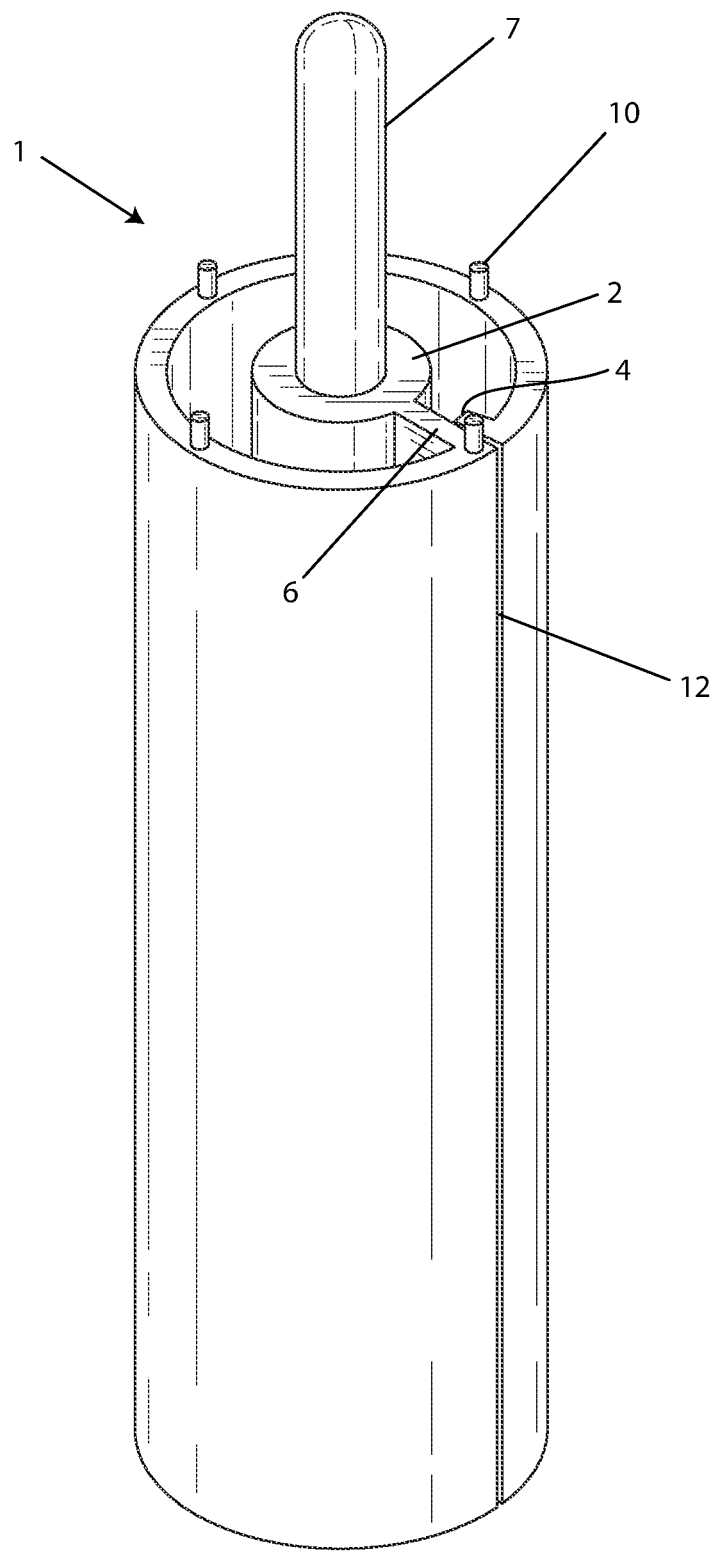
FIG. 22 is a perspective view of another embodiment of the invention, showing the conduit member having one retaining arm.
Figure 23:
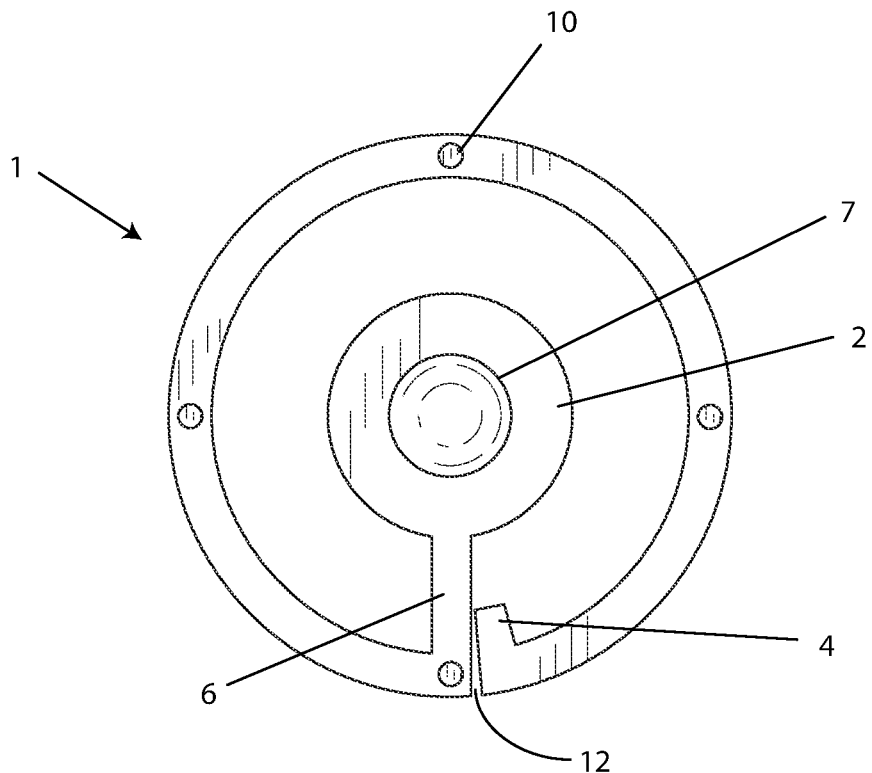
FIG. 23 is a top plan view of FIG. 22 thereof.
Figure 24:
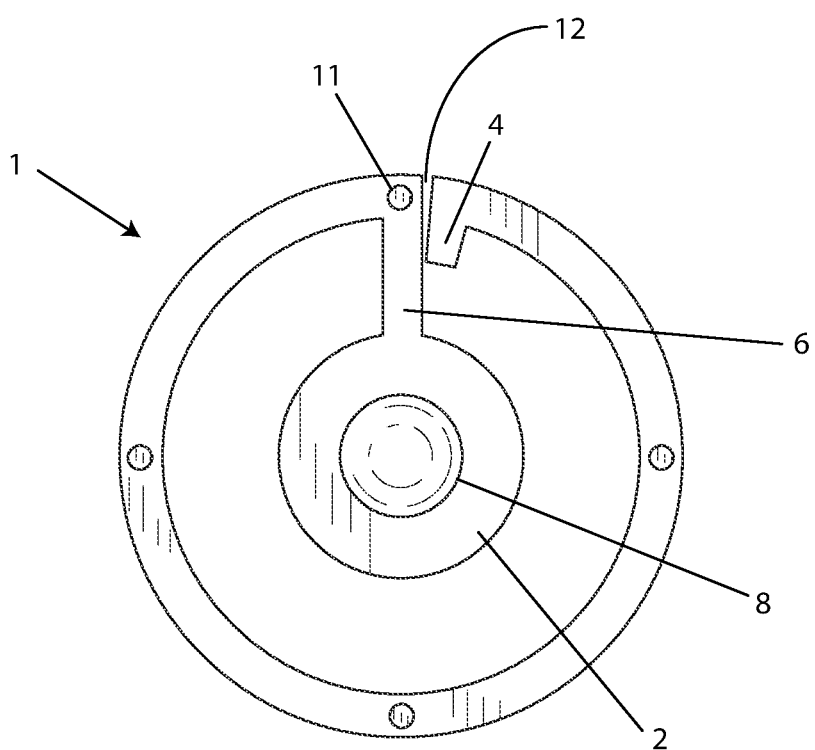
FIG. 24 is a bottom plan view of FIG. 22 thereof.
Figure 25:
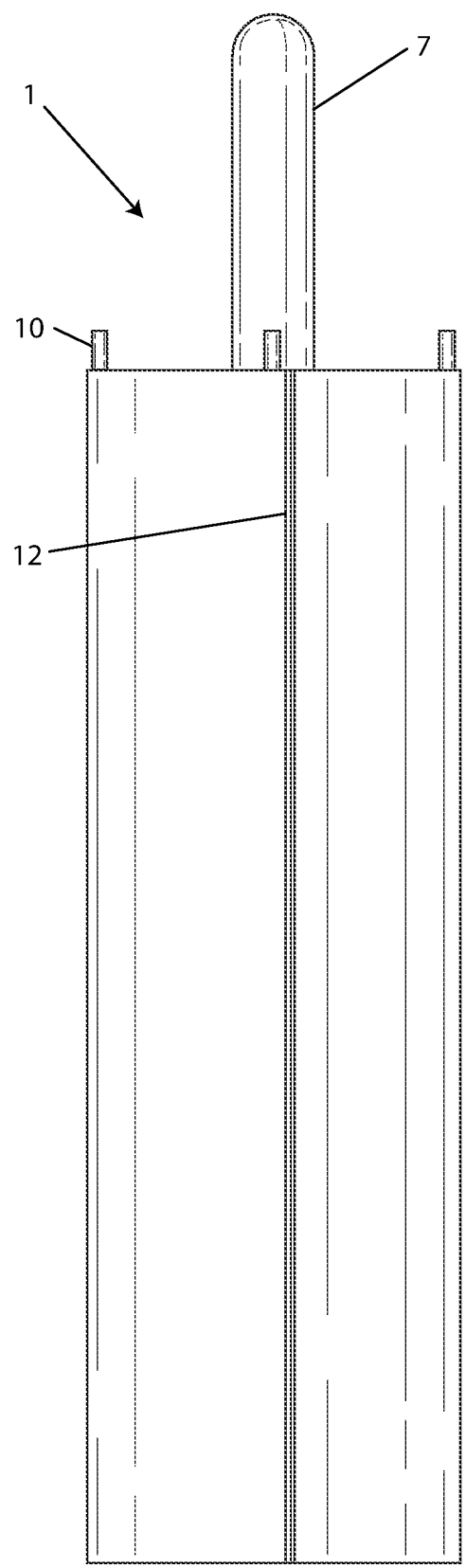
FIG. 25 is a front elevation view of FIG. 22 thereof.
Figure 26:
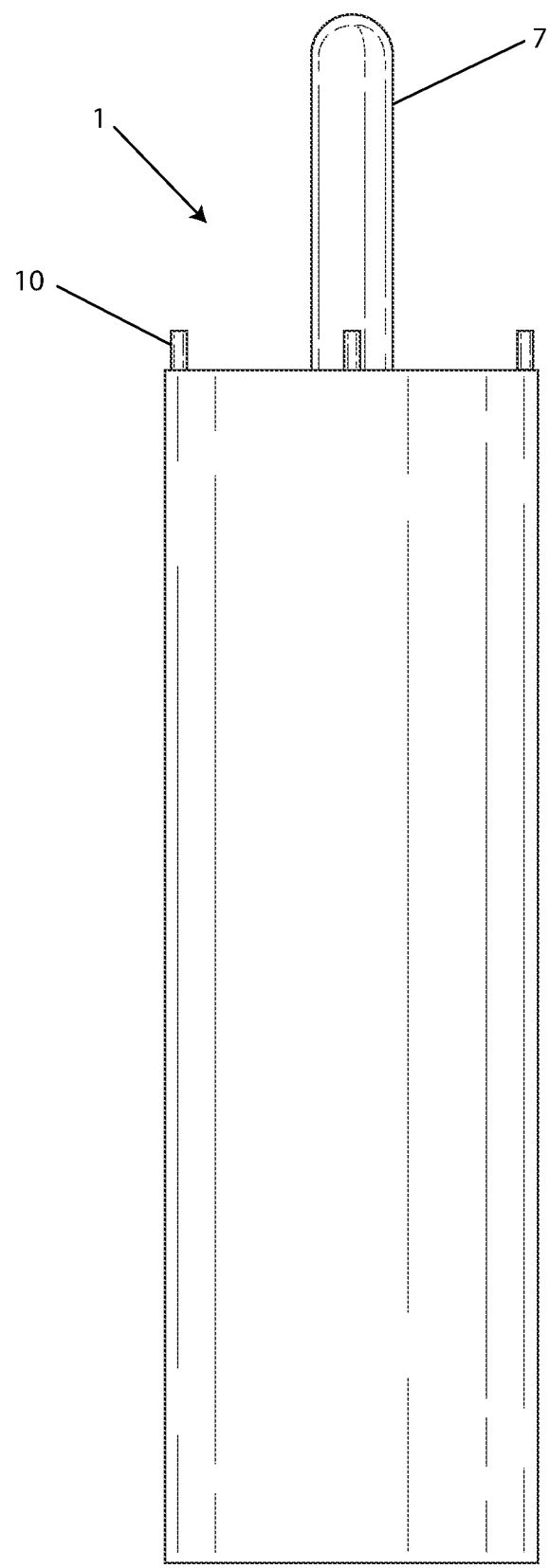
FIG. 26 is a rear elevation view of FIG. 22 thereof.
Figure 27:
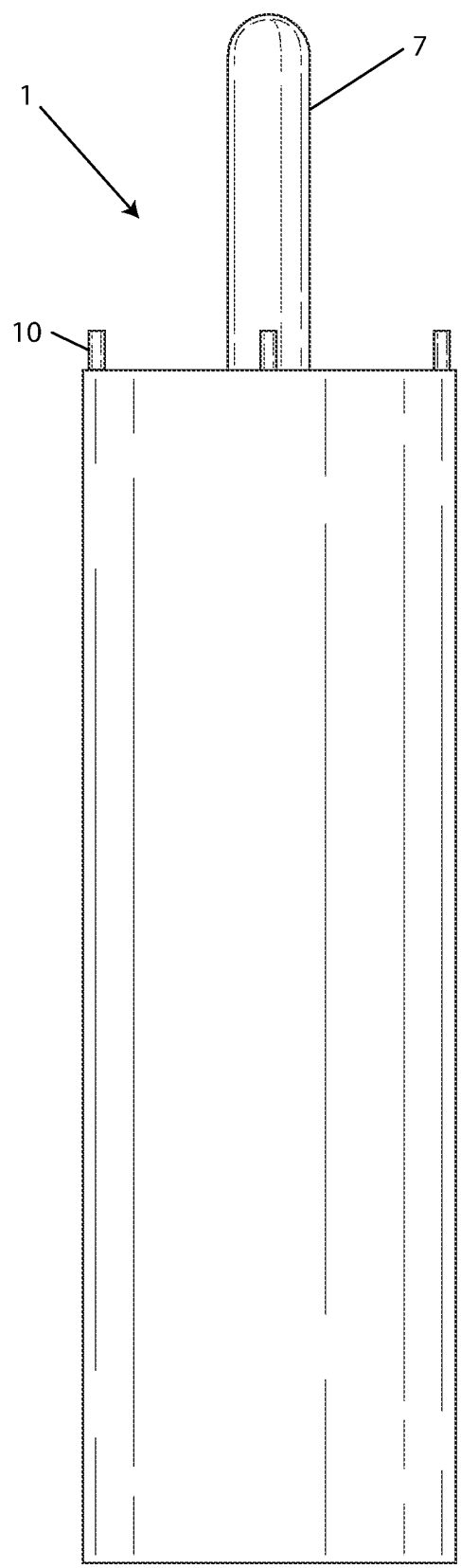
FIG. 27 is a left side elevation view of FIG. 22 thereof.
Figure 28:
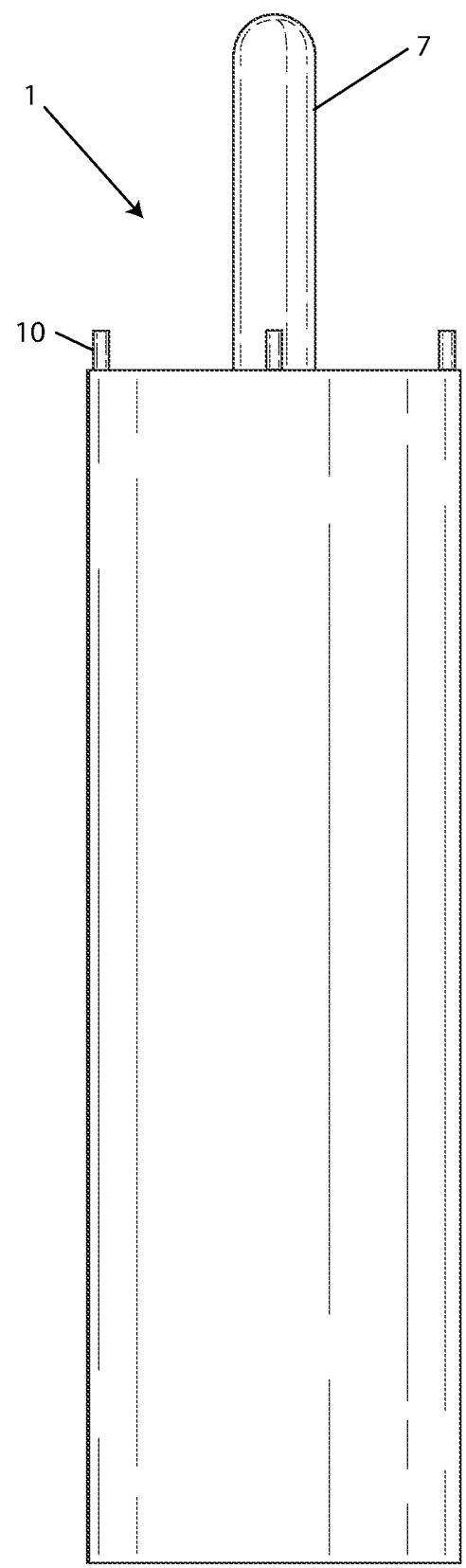
FIG. 28 is a right side elevation view of FIG. 22 thereof.
Figure 29:
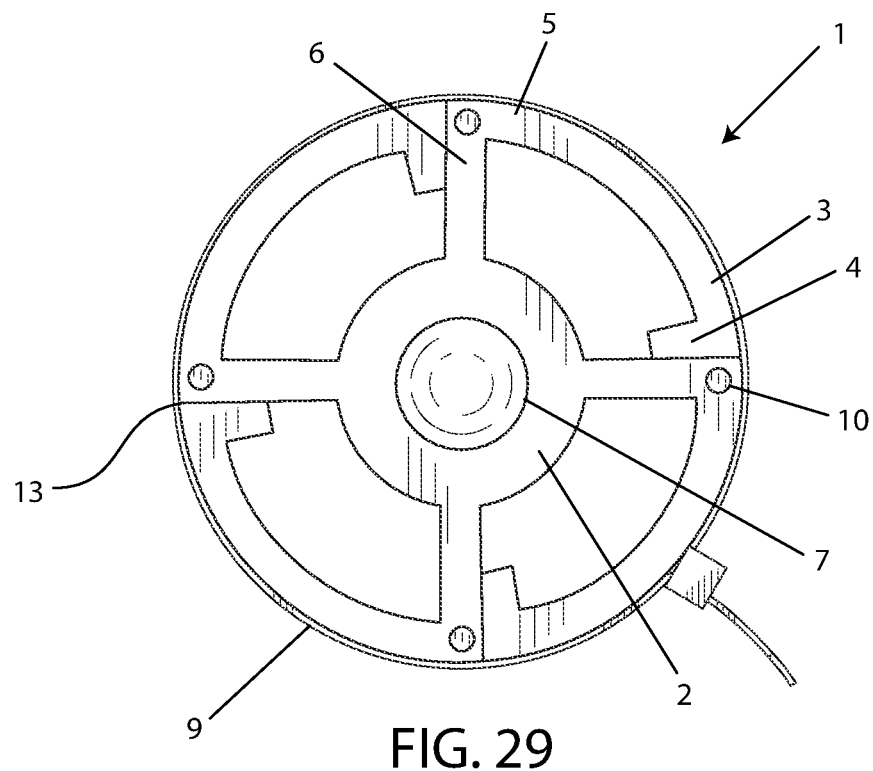
FIG. 29 is a top plan view of FIG. 11 thereof.
Figure 30:
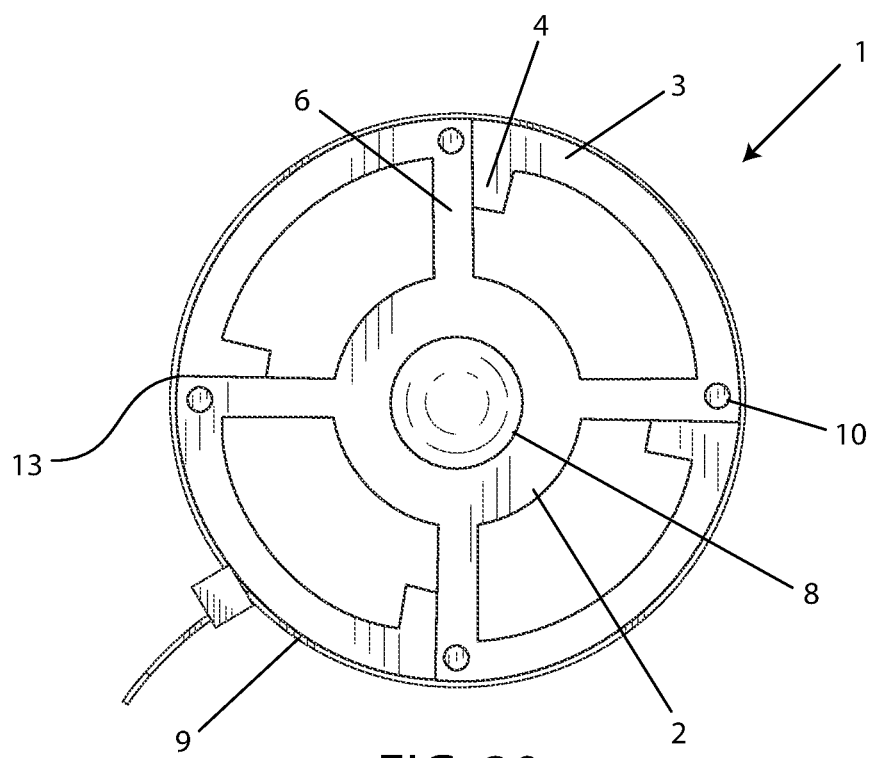
FIG. 30 is a bottom plan view of FIG. 11 thereof.
Figure 31:
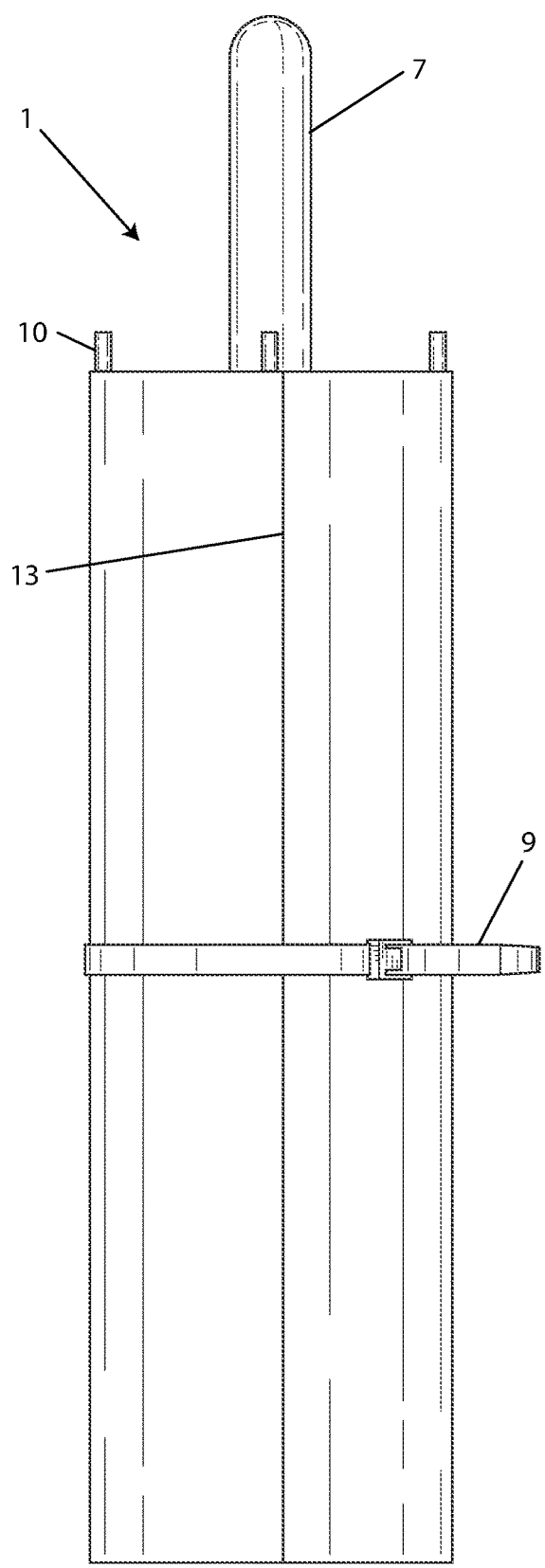
FIG. 31 is a first side elevation vie of FIG. 11 thereof.
Figure 32:
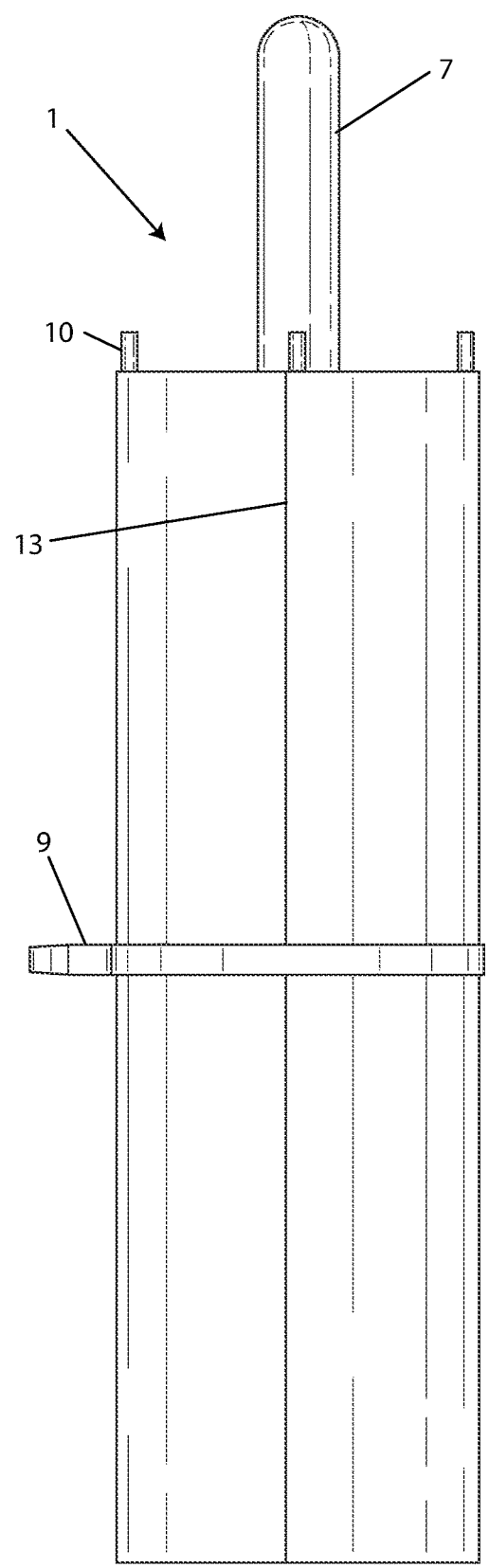
FIG. 32 is a second side elevation view of FIG. 11 thereof.

The drawing figures reference a few embodiments of the invention. FIGS. 1-10 depict an individual conduit member 1 having four retaining arms 3, along with a cross-sectional view. FIGS. 11-13 depict the modular conduit cable management assembly with two conduit members 1 coupled together and secured with a closure member 9. FIGS. 14-18 depict the modular conduit cable management assembly with three conduit members 1 coupled together. FIG. 19-21 depict the modular conduit cable management assembly with a plurality of conduit members 1 coupled together and secured with closure members 9, with FIG. 19 further depicting a plurality of cables extending from the top of the uppermost conduit member 1 and leading into an opening inside a vertical structure. FIGS. 22-28 depict another embodiment of the invention, with an individual conduit member 1 having a single retaining arm 3.

One embodiment of the invention, as shown in the figures, is a modular conduit cable management assembly comprising (including or having) 1) a plurality of conduit members 1 and 2) a plurality of closure members 9. Each of the plurality of conduit members 1 is removably coupled end to end to a requisite height next to a vertical structure for retaining and managing one or more cables within one or more cable tracks. Each of the plurality of conduit members 1 has a body 101. The body has at least one retaining arm 3 and a plurality of prongs 10, and has a core 2 and an anchor 7. Each individual conduit member 1 of the plurality of conduit members 1 defines at least one holding cavity, a receiving chamber 8, at least one slot opening, and a plurality of holes 11 or apertures 11. Each of the plurality of holes 11 corresponds to each of the plurality of prongs 10. One of each of the plurality of closure members 9 removably encloses at least one of the plurality of the conduit members 1. The modular stacking or alignment of at least one holding cavity of each of the plurality of conduit members 1 forms a conduit track within which one or more cables are held.

Each one of the plurality of conduit members 1 used in the assembly is essentially identical. Accordingly, any individual conduit member 1 may be interchanged with another conduit member 1 during installation. Also, the top-to-bottom or first end-to-second end orientation of each of the plurality of conduit members 1 may be inverted at the beginning of the assembly. For example, the orientation may be installed having the first end (or anchor 7 end) aimed upwardly or having the second end (or chamber 8 end) aimed upwardly. The assembly uses a modular arrangement of a plurality of conduit members 1 being installed and abutting end-to-end to form an interior conduit track through which one or more cables can be installed, repaired, or replaced in an easy, efficient, cost-effective manner.

As shown in the figures, each conduit member 1 is preferably configured as an elongated tubular or cylindrical pipe having an inner core 2 extending longitudinally therethrough and an outer body formed from one or more retaining arms 3 extending the length of the pipe, with each of the arms being affixed to the core 2. The conduit member 1 is constructed from materials that are weather resistant and sturdy, yet flexible so that the cables can be inserted into and held within the conduit track. The overall width and length of each conduit member 1 may depend upon the particular specifications of the cable(s) and the vertical structure.

The structural foundation portion of the conduit member 1 is the core 2, the anchor 7, and the receiving chamber 8. This foundation anchors 7 and supports the assembly of multiple conduit members 1. The core 2 is preferably centrally located within the conduit member 1. A portion of each retaining arm 3 abuts and is affixed to an outer shell of the core 2 to help maintain the position of the core 2 within the conduit member 1.

The core 2 of each conduit member 1 extends the length of the conduit member 1. One end of the core 2 forms part of the first end (or top) of the conduit member 1. An opposing, second end of the core 2 forms part of the second end (or bottom) of the conduit member 1. The structure of the core 2 further distinguishes the invention from a conventional conduit pipe. The core is a tubular or cylindrical member spaced from the body of the conduit member, and is held in place with part of at least one retaining arm 3 being affixed thereto, as shown in the figures.

The core 2 of each conduit member 1 has an anchor protruding from a first end of the core. An opposite, second end of the core 2 defines a receiving chamber therein. The receiving chamber receives the anchor of another conduit member 1 when conduit members 1 are assembled end to end.

The at least one retaining arm 3 of each conduit member 1 functions as a cable guide leading into the at least one holding cavity within the conduit member 1. Each arm has 1) a lead edge 4 (or flange) leading to the slot opening and into the holding cavity, 2) an arcuate portion 5, and 3) a trailing end 6 abutting and affixed to the core 2. The structure of the arm allows the cable to be inserted through the slot opening for retaining in the holding, cavity. Each conduit member's 1 cylindrical body is essentially formed from the at least one retaining, arm 3. The lead edge 4 is preferably perpendicular to the core 2 and to the arm arcuate portion 5. The length of the lead edge 4 is preferably at least half the length of the arm trailing end 6. The lead edge 4 is essentially a flange extending perpendicular to and inwardly from the proximal end of the arcuate arm. The arcuate portion 5 of the arm is spaced apart from the exterior of the core 2 to form the cable holding cavity of the conduit track. The distal end of the arm arcuate portion 5 has the trailing end 6 that extends perpendicular and inwardly toward the core 2, with the trailing end 6 being affixed to the core 2. A slot opening is formed from a gap or spacing between the outer side of each arm lead edge 4 and the outer side of the arm trailing end 6. The slot opening of the arm is biased in an open position for receiving one or more cables. The arm is adapted to slightly compress so that the slot opening is closed when pressure from the closure member 9 is applied to the conduit member 1. The dimensions of each retaining arm 3 depends on the number of retaining aims 3 present on the conduit member 1. The shape of each retaining arm 3 prevents the installed cables from inadvertently dislodging from the unit. Using the closure members 9 further prevents inadvertent dislodging from the unit.

In an embodiment shown in FIGS. 1 through 21, the individual conduit member 1 has four retaining arms 3. Each arm preferably has the same dimensions. When a plurality of conduit members 1 are installed in a modular arrangement, each conduit member 1 should be aligned end to end with another conduit member 1 so that the slot openings are aligned to form a continuous track for cable insertion, and aligned so that the anchor 7 and plurality of prongs 10 of one conduit member 1 can be inserted into the respective receiving chamber 8 and plurality of apertures 11 of another conduit member 1. In another embodiment shown in FIGS. 22-28, the individual conduit member 1 has a single retaining aim 3. In another embodiment (not shown), the individual conduit member 1 may have two retaining arms 3, three retaining arms 3, or more than four retaining arms 3.

Each of the plurality of conduit members 1 has a first end having a plurality of prongs 10 and a second end defining a plurality of holes 11 or apertures 11. As shown in the figures, the location of each of the plurality of prongs 10 is essentially at the top or first end of the at least one retaining arm 3. The location of each of the plurality of apertures 11 is essentially at the bottom or second end of the at least one retaining arm 3. When the conduit member 1 has a plurality of retaining arms 3, each of the plurality of prongs 10 extend upwardly from individual retaining arms 3, and each of the plurality of apertures 11 are aligned at an opposing end of the retaining arms 3. During installation, for example, the plurality of apertures 11 of a first conduit member 1 are insertably aligned and coupled to the corresponding plurality of prongs 10 of a second conduit member 1, with the chamber 8 of the first conduit member 1 being insertably aligned and coupled to the anchor 7 of the second conduit member 1. The prongs 10 and corresponding apertures 11 add further stability to the assembly after installation.

At a first end (top) of the conduit member 1, four prongs 10 extend from the top or first end of the conduit member 1. Here each prong 10 essentially extends from the arm. At an opposite second end (bottom) of the conduit member 1 are four apertures 11. Each aperture 11 is positioned in the conduit member 1 to correspond with each prong 10.

Each of the plurality of closure members 9 encloses at least one of the plurality of conduit members 1 by encircling the conduit member 1, then applying pressure to compress are arm lead edge 4 against an arm trailing end 6 to close the slot opening, as shown in FIGS. 29-32. When in a closed position 13, the cable cannot slip out the slot opening. The closure member 9 is easily removed to access an individual conduit member 1 of the cable(s) located therein. When the closure member 9 is removed, the lead edge 4 of the arm separates and returns to its biased open 12 position. The closure member 9 is installed around the conduit member 1 after the cable is inserted and arranged within the conduit member 1. The width of the closure member 9 allows the user to utilize a single closure member 9 for two conduit members 1. Here, the closure member 9 acts as a seal at the conduit member 1 connection point while also compressing the at least one retaining arm 3 to close the at least one slot opening.

The plurality of closure members 9 may be a zip tie, clamp, duct clamp, metal band, or a plastic band. Rather than securing individual cables or the conduit directly to the vertical structure, one closure member 9 encircles the abutting connection point of two conduit members 1 and is fastened to close the slot opening. One or more of the plurality of closure members 9 may be further secured to the vertical structure with another fastener. Alternatively, one or more of the plurality conduit members 1 may be anchored 7 to the ground or surface, with the closure member used only for closing the slot opening of the conduit member. Metal bands, namely, metal zip ties, are preferred because these types of closure members provide more pressure against the conduit member 1 than plastic bands, yet do not damage the conduit member 1. Each of the plurality of closure members 9 may be used every several feet along the assembly length, as shown in FIG. 19.

The modular conduit cable management assembly allows a user to install a plurality of conduit members 1 up the length of a tall outdoor vertical structure, such as at least 75 feet, 100 feet, or higher. The assembly also allows a user to manage one or more cables within the conduit track, and to install and access the cables after installation while reusing the same plurality of conduit members 1. Due to the structural design, the user can separate and isolate individual cables within the conduit track as needed. The conduit members 1 can be reused multiple times to add new cables or to replace cables. Due to the plurality of conduit tracks formed from the plurality of retaining arms 3 of each conduit member 1, multiple cables can be installed within a single conduit assembly, with each cable having its own track. Alternatively, more than one cable can be installed within the same conduit track.

In one embodiment, the invention is a modular conduit cable management assembly for retaining one or more cables for use with a vertical structure, the modular conduit cable management assembly comprising:

a. a plurality of conduit members 1, each of the plurality of conduit members 1 having a core 2 and a body, with the body having a first end and an opposing second end, four retaining arms 3, an anchor 7, and a plurality of prongs 10 extending from the first end of the body, with each of the plurality of conduit members 1 defining four slot openings each for receiving one or more cables, four holding cavities each for holding one or more cables forming a conduit track, a chamber 8 for coupling with the anchor 7 of a second of the plurality of conduit members 1, and a plurality of apertures 11 within the second end of the body for coupling with the plurality of prongs 10 of the second of the plurality of conduit members 1;

b. a plurality of closure members 9, each of the plurality of closure members 9 being adapted for enclosing the four slot openings of at least one of the plurality of conduit members 1; and c. wherein the plurality of conduit members 1 each being selectively assembled end-to-end with each of the plurality of apertures 11 of a first of the plurality of conduit members 1 being coupled to each corresponding plurality of prongs 10 of the second of the plurality of conduit members 1 and the chamber 8 of the first of the plurality of conduit members 1 being coupled to the anchor 7 of the second of the plurality of conduit members 1, forming a stable assembly having four conduit tracks therein for retaining one or more cables, and with each of the plurality of closure members 9 enclosing the four slot openings of each of the plurality of conduit members 1.

In another embodiment, the invention is a modular conduit cable, management assembly for retaining one or more cables for use with a vertical structure, the modular conduit cable management assembly comprising:

a. a plurality of conduit members 1, each of the plurality of conduit members 1 having
    i. a core 2 extending longitudinally therethrough and having a first end with an anchor 7 extending therefrom and an opposing second end defining, a chamber 8, and
    ii. a plurality of retaining arms 3 each having a first end with a plurality of prongs 10 one of each of the prongs 10 extending therefrom and an opposing second end defining a plurality of apertures 11, with each of the plurality of retaining arms 3 defining a slot opening biased in an open position and a holding cavity for receiving and holding one or more cables forming a conduit track, and
    iii. with the plurality of apertures 11 defined within the second end of a first of the plurality of retaining arms 3 of a first of the plurality of conduit members 1 removably coupling with the plurality of prongs 10 of the second of the plurality of conduit members 1, and with the chamber 8 defined within the second end of the core 2 of the first of the plurality of conduit members 1 coupling with the anchor 7 of a first end of the core 2 of the second of the plurality of conduit members 1;
  b. a plurality of closure members 9, each of the plurality of closure members 9 being adapted for enclosing the slot opening of at least one of the plurality of conduit members 1; and
  c. wherein the plurality of conduit members 1 each being selectively assembled end-to-end with each of the plurality of apertures 11 of a first of the plurality of conduit members 1 being coupled to each corresponding plurality of prongs 10 of the second of the plurality of conduit members 1, with the chamber 8 of the first of the plurality of conduit members 1 being coupled to the anchor 7 of the second of the plurality of conduit members 1 forming a stable assembly having the conduit track therein for retaining one or more cables, and with each of the plurality of closure members 9 enclosing the slot opening of each of the plurality of conduit members 1.

In yet another embodiment (not shown), one or more of the plurality of conduit members may be configured into a substantially "elbow" shape to allow further flexibility in modular arrangement of the assembly. In this embodiment, the bend or elbow in one of the conduit members may be at 60 degrees or 90 degrees. The remaining components disclosed for the previous embodiments remain the same, except at the bend of the conduit member. For example, a conduit member would have at least one retaining arm, at least one slot opening, an anchor, the core, and the receiving chamber would have the same arrangement as the other embodiments, albeit no longer in a parallel configuration but in an "L" or "elbow" configuration. Here, approximately half of the length of the at least one retaining arm and the core would be bent at the appropriate angle, with the anchor extending from the core perpendicular from the receiving chamber defined at the bottom or second end of the core of the conduit member.

Those skilled in the art who have the benefit of this disclosure will appreciate that it may be used as the creative basis for designing devices or methods similar to those disclosed herein, or to design improvements to the invention disclosed herein; such new or improved creations should be recognized as dependent upon the invention disclosed herein, to the extent of such reliance upon this disclosure.

I claim:

1. A modular conduit cable management assembly for fully enclosing, retaining, managing, and accessing a length of one or more cables for use with a vertical structure, the modular conduit cable management assembly comprising:

a. a plurality of conduit members, each of the plurality of conduit members having a body; with the body of each of the plurality of conduit members comprising: (i) a first end and a second end, (ii) a core, (iii) an anchor, (iv) at least one retaining arm, and (v) a plurality of prongs; with the plurality of prongs of the body of each of the plurality of conduit members extending from the first end of the body of the respective conduit member; each of the plurality of conduit members (i) defining at least one slot opening for receiving the one or more cables, (ii) defining at least one holding cavity forming at least one conduit track for retaining the one or more cables, (iii) defining a chamber, and (iv) defining a plurality of apertures within the second end of the body of the respective conduit member; and
  b. a plurality of closure members, each of the plurality of closure members is adapted for enclosing at least one of the plurality of conduit members, thereby releasably abutting the at least one retaining arm of the body of the at least one of the plurality of conduit members against the at least one slot opening of the at least one of the plurality of conduit members;
  c. wherein the plurality of conduit members are selectively assembled end-to-end, with each of the plurality of apertures of a first one of any two adjacent conduit members of the assembled plurality of conduit members being coupled to a respective one of the plurality of prongs of the body of a second one of the any two adjacent conduit members of the assembled plurality of conduit members, and with the chamber of the first one of the any two adjacent conduit members of the assembled plurality of conduit members being coupled to the anchor of the core of the body of the second one of the any two adjacent conduit members of the assembled plurality of conduit members; wherein the assembled plurality of conduit members abut against each other end-to-end, thereby defining at least one continuous conduit track extending through each of the assembled plurality of conduit members, with the at least one continuous conduit track being formed by the at least one conduit track defined in each of the assembled plurality of conduit members; and wherein the at least one retaining arm of the body of each of the assembled plurality of conduit members is configured to fully enclose the length of the one or more cables and prevent the one or more cables retained within the at least one conduit track defined in each of the assembled plurality of conduit members from inadvertently slipping out through the at least one slot opening defined in each of the assembled plurality of conduit members.

2. The modular conduit cable management assembly of claim 1, the at least one retaining arm of the body of each of the plurality of conduit members forming at least two retaining arms, with each of the at least two retaining arms of the body of each of the plurality of conduit members comprising a lead edge, an arcuate portion, and a trailing end, and with the lead edge of each of the at least two retaining arms of the body of each of the plurality of conduit members being biased in an open position; and with the at least one slot opening of each of the plurality of conduit members forming from a gap between the lead edge of a first retaining arm of the at least two retaining arms of the body of the respective conduit member and the trailing end of a second retaining arm of the at least two retaining arms of the body of the respective conduit member.

3. The modular conduit cable management assembly of claim 2, wherein the trailing end of each of the at least two retaining arms of the body of each of the plurality of conduit members abuts and is affixed substantially perpendicular to the core of the body of the respective conduit member; and wherein the lead edge of each of the at least two retaining arms of the body of each of the plurality of conduit members is substantially perpendicular to and spaced apart from the core of the body of the respective conduit member.

4. The modular cable conduit cable management assembly of claim 1, the at least one retaining arm of the body of each of the plurality of conduit members forming four retaining arms, with the four retaining arms of the body of each of the plurality of conduit members being a first retaining arm, a second retaining arm, a third retaining arm, a fourth retaining arm, with each of the four retaining arms of the body of each of the plurality of conduit members comprising a lead edge, an arcuate portion, and a trailing end; the at least one slot opening of each of the plurality of conduit members forming four slot openings, with the four slot openings of each of the plurality of conduit members being a first slot opening, a second slot opening, a third slot opening, and a fourth slot opening, with the first slot opening of the four slot openings of each of the plurality of conduit members being formed by the lead edge of the first retaining arm of the four retaining arms of the body of the respective conduit member and the trailing end of the second retaining arm of the four retaining arms of the body of the respective conduit member, with the second slot opening of the four slot openings of each of the plurality of conduit members being formed by the lead edge of the second retaining arm of the four retaining arms of the body of the respective conduit member and the trailing end of the third retaining arm of the four retaining arms of the body of the respective conduit member, with the third slot opening of the four slot openings of each of the plurality of conduit members being formed by the lead edge of the third retaining arm of the four retaining arms of the body of the respective conduit member and the trailing end of the fourth retaining arm of the four retaining arms of the body of the respective conduit member, and with the fourth slot opening of the four slot openings of each of the plurality of conduit members being formed by the lead edge of the fourth retaining arm of the four retaining arms of the body of the respective conduit member and the trailing end of the first retaining arm of the four retaining arms of the body of the respective conduit member.

5. The modular conduit cable management assembly of claim 1, the core of the body of each of the plurality of conduit members comprising a first end and an opposing second end, with the anchor of the body of each of the plurality of conduit members extending from the first end of the core of the body of the respective conduit member, and with the chamber within each of the plurality of conduit members being defined by the opposing second end of the core of the body of the respective conduit member.

6. A modular conduit cable management assembly for fully enclosing, retaining, managing, and accessing a length of one or more cables for use with a vertical structure, the modular conduit cable management assembly comprising:

a. a plurality of conduit members, each of the plurality of conduit members having a body; with the body of each of the plurality of conduit members comprising (i) a first end and a second end, (ii) a core, (iii) an anchor, (iv) four retaining arms, and (v) a plurality of prongs; with the plurality of prongs of the body of each of the plurality of conduit members extending from the first end of the body of the respective conduit member; with each of the plurality of conduit members (i) defining four slot openings for receiving the one or more cables, (ii) defining four holding cavities forming four respective conduit tracks for retaining the one or more cables, (iii) defining a chamber, and (iv) defining a plurality of apertures within the second end of the body of the respective conduit member; and b. a plurality of closure members, each of the plurality of closure members is adapted for enclosing at least one of the plurality of conduit members, thereby releasably abutting the four retaining arms of the body of the at least one of the plurality of conduit members against the four slot openings of the at least one of the plurality of conduit members;

c. wherein the plurality of conduit members are selectively assembled end-to-end, with each of the plurality of apertures of a first one of any two adjacent conduit members of the assembled plurality of conduit members being coupled to a respective one of the plurality of prongs of the body of a second one of the any two adjacent conduit members of the assembled plurality of conduit members, and with the chamber of the first one of the any two adjacent conduit members of the assembled plurality of conduit members being coupled to the anchor of the body of the second one of the any two adjacent conduit members of the assembled plurality of conduit members; wherein the assembled plurality of conduit members abut against each other end-to-end, thereby forming four continuous conduit tracks each extending through each of the assembled plurality of conduit members, with each of the four continuous conduit tracks being formed by a respective one of the four conduit tracks defined in each of the assembled plurality of conduit members; and wherein of the four retaining arms of the body of each of the assembled plurality of conduit members are configured to fully enclose the length of the one or more cables and prevent the one or more cables retained within the four conduit tracks defined in each of the assembled plurality of conduit members from inadvertently slipping out through any of the four slot openings defined in each of the assembled plurality of conduit members.

7. The modular conduit cable management assembly of claim 6, each of the four retaining arms of the body of each of the plurality of conduit members further comprising a lead edge, an arcuate portion, and a trailing end, with the lead edge of each of the four retaining arms of the body of each of the plurality of conduit members being biased in an open position; and with each of the four slot openings of each of the plurality of conduit members forming a gap between the lead edge of one of the four retaining arms of the body of the respective conduit member and the trailing end of another one of the four retaining arms of the body of the respective conduit member.

8. The modular conduit cable management assembly of claim 7, the trailing end of each of the four retaining arms of the body of each of the plurality of conduit members abutting substantially perpendicular to the core of the body of the respective conduit member and being affixed thereto, and the lead edge of each of the four retaining arms of the body of each of the plurality of conduit members being substantially perpendicular to and spaced apart from the core of the body of the respective conduit member.

9. The modular conduit cable management assembly of claim 7, the four retaining arms of each of the plurality of conduit members defining a first retaining arm, a second retaining arm, a third retaining arm, and a fourth retaining arm; the four slot openings of each of the plurality of conduit members defining a first slot opening, a second slot opening, a third slot opening, and a fourth slot opening, with the first slot opening of the four slot openings of each of the plurality of conduit members being formed by the lead edge of the first retaining arm of the four retaining arms of the body of the respective conduit member and the trailing end of the second retaining arm of the four retaining arms of the body of the respective conduit member, with the second slot opening of the four slot openings of each of the plurality of conduit members being formed by the lead edge of the second retaining arm of the four retaining arms of the body of the respective conduit member and the trailing end of the third retaining arm of the four retaining arms of the body of the respective conduit member, with the third slot opening of the four slot openings of each of the plurality of conduit members being formed by the lead edge of the third retaining arm of the four retaining arms of the body of the respective conduit member and the trailing end of the fourth retaining arm of the four retaining arms of the body of the respective conduit member, and with the fourth slot opening of the four slot openings of each of the plurality of conduit members being formed by the lead edge of the fourth retaining arm of the four retaining arms of the body of the respective conduit member and the trailing end of the first retaining arm of the four retaining arms of the body of the respective conduit member.

10. The modular conduit cable management assembly of claim 6, the core of the body of each of the plurality of conduit members comprising a first end and a second end, with the anchor of the body of each of the plurality of conduit members being configured at the first end of the body of the respective conduit member, and with the chamber of each of the plurality of conduit members being defined in the second end of the body of the respective conduit member.

11. A modular conduit cable management assembly for fully enclosing, retaining, managing, and accessing a length of one or more cables for use with a vertical structure, the modular conduit cable management assembly comprising:
   a. a plurality of conduit members, each of the plurality of conduit members having
      i. a core extending longitudinally through each of the plurality of conduit members, with the core of each of the plurality of conduit members having a first end and a second end
      ii. an anchor, with the anchor of each of the plurality of conduit members extending from the first end of the core of the respective conduit member,
      iii. a plurality of retaining arms, with each of the plurality of retaining arms of each of the plurality of conduit members comprising (A) a first end and a second end, (B) at least one prong extending from the first end of the respective retaining arm of the respective conduit member, and (C) at least one aperture defined within the second end of the respective retaining arm of the respective conduit member,
      iv. with each of the plurality of conduit members (A) defining a chamber formed in the second end of the core of the respective conduit member, (B) defining at least one slot opening, and (C) defining a holding cavity for receiving and holding the one or more cables, with the holding cavity of each of the plurality of conduit members forming at least one conduit track within the respective conduit member, and
   b. a plurality of closure members, each of the plurality of closure members is adapted for enclosing the at least one slot opening of at least one of the plurality of conduit members; wherein the plurality of conduit members are selectively assembled end-to-end, with the at least one aperture defined within the second end of each of the plurality of retaining arms of a first one of any two adjacent conduit members of the assembled plurality of conduit members being coupled to the at least one prong extending from the first end of a respective one of the plurality of retaining arms of a second one of the any two adjacent conduit members of the assembled plurality of conduit members, and with the chamber formed in the second end of the core of the first one of the any two adjacent conduit members of the assembled plurality of conduit members being coupled to the anchor of the second one of the any two adjacent conduit members of the assembled plurality of conduit members; wherein the assembled plurality of conduit members abut against each other end-to-end, thereby defining at least one continuous conduit track extending through each of the assembled plurality of conduit members, with the at least one continuous conduit track being formed by the at least one conduit track defined in each of the assembled plurality of conduit members; and wherein the plurality of retaining arms of each of the assembled plurality of conduit members are configured to fully enclose the length of the one or more cables and prevent the one or more cables retained within the at least one conduit track defined in each of the assembled plurality of conduit members from inadvertently slipping out through the at least one slot opening defined in each of the assembled plurality of conduit members.

12. The modular conduit cable management assembly of claim 11, each of the plurality of retaining arms of each of the plurality of conduit members further comprising a lead edge, an arcuate portion, and a trailing end; with the at least one slot opening of each of the plurality of conduit members further comprising four slot openings, with each of the four slot openings of each of the plurality of conduit members forming from a gap between the lead edge of one of the plurality of retaining arms of the respective conduit member and the trailing end of another one of the plurality of retaining arms of the respective conduit member, and with the lead edge of each of the plurality of retaining arms of each of the plurality of conduit members being biased in an open position.

13. The modular conduit cable management assembly of claim 12, the trailing end of each of the plurality of retaining arms of each of the plurality of conduit members abutting substantially perpendicular to the core of the respective conduit member and being affixed thereto, and the lead edge of each of the plurality of retaining arms of each of the plurality of conduit members being substantially perpendicular to and spaced apart from the core of the respective conduit member.

14. The modular conduit cable management assembly of claim 11, the plurality of retaining arms of each of the plurality of conduit members forming at least four retaining arms, with the at least four retaining arms of each of the plurality of conduit members defining a first retaining arm, a second retaining arm, a third retaining arm, and a fourth retaining arm, with each of the at least four retaining arms of each of the plurality of conduit members comprising a lead edge, an arcuate portion, and a trailing end; the at least one slot opening of each of the plurality of conduit members forming at least four slot openings, with the at least four slot openings of each of the plurality of conduit members defining a first slot opening, a second slot opening, a third slot opening, and a fourth slot opening, with the first slot opening of the at least four slot openings of each of the plurality of conduit members being formed by the lead edge of the first retaining arm of the at least four retaining arms of the respective conduit member and the trailing end of the second retaining arm of the at least four retaining arms of the respective conduit member, with the second slot opening of the at least four slot openings of each of the plurality of conduit members being formed by the lead edge of the second retaining arm of the at least four retaining arms of the respective conduit member and the trailing end of the third retaining arm of the at least four retaining arms of the respective conduit member, with the third slot opening of the at least four slot openings of each of the plurality of conduit members being formed by the lead edge of the third retaining arm of the at least four retaining arms of the respective conduit member and the trailing end of the fourth retaining arm of the at least four retaining arms of the respective conduit member, and with the fourth slot opening of the at least four slot openings of each of the plurality of conduit members being formed by the lead edge of the fourth retaining arm of the at least four retaining arms of the respective conduit member and the trailing end of the first retaining arm of the at least four retaining arms of the respective conduit member.

* * * * *